United States Patent
Florissi et al.

(10) Patent No.: US 10,122,806 B1
(45) Date of Patent: Nov. 6, 2018

(54) DISTRIBUTED ANALYTICS PLATFORM

(71) Applicant: EMC Corporation, Hopkinton, MA (US)

(72) Inventors: Patricia Gomes Soares Florissi, Briarcliff Manor, NY (US); Orna Berry, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 147 days.

(21) Appl. No.: 14/986,276

(22) Filed: Dec. 31, 2015

Related U.S. Application Data

(60) Provisional application No. 62/193,059, filed on Jul. 15, 2015, provisional application No. 62/143,404, filed on Apr. 6, 2015.

(51) Int. Cl.
*G06F 15/173* (2006.01)
*H04L 29/08* (2006.01)
*H04L 12/751* (2013.01)

(52) U.S. Cl.
CPC .............. *H04L 67/22* (2013.01); *H04L 45/02* (2013.01); *H04L 67/02* (2013.01); *H04L 67/10* (2013.01); *H04L 67/12* (2013.01)

(58) Field of Classification Search
CPC ......... H04L 67/22; H04L 45/02; H04L 67/02; H04L 67/10; H04L 67/12
See application file for complete search history.

(56) References Cited

U.S. PATENT DOCUMENTS

| | | |
|---|---|---|
| 6,516,350 B1 | 2/2003 | Lumelsky et al. |
| 7,934,018 B1 | 4/2011 | Lavallee et al. |
| 8,806,061 B1 | 8/2014 | Lobo et al. |
| 9,020,802 B1 | 4/2015 | Florissi et al. |
| 9,031,992 B1 | 5/2015 | Florissi et al. |
| 9,158,843 B1 | 10/2015 | Florissi et al. |

(Continued)

OTHER PUBLICATIONS

V.K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.

(Continued)

*Primary Examiner* — Moustafa M Meky
*Assistant Examiner* — Kidest Mendaye
(74) *Attorney, Agent, or Firm* — Ryan, Mason & Lewis, LLP

(57) ABSTRACT

An apparatus comprises an analytics platform having a plurality of distributed processing nodes. Data from a data source is received at a first one of the processing nodes. One or more analytics operations are performed on the data at the first processing node, and the data is updated at the first processing node based on results of the one or more analytics operations. The updated data is transmitted to another one of the processing nodes along a data path between the data source and a data destination. The performing, updating and transmitting are repeated for the other processing node and for one or more additional distributed processing nodes of the analytics platform along the data path. The analytics platform thereby performs distributed analytics processing on the data over multiple distributed processing nodes as the data moves through the data path from the data source to the data destination.

19 Claims, 19 Drawing Sheets

(56) References Cited

U.S. PATENT DOCUMENTS

| | | | |
|---|---|---|---|
| 9,280,381 | B1 | 3/2016 | Florissi et al. |
| 9,338,218 | B1 | 5/2016 | Florissi et al. |
| 9,361,263 | B1 | 6/2016 | Florissi et al. |
| 9,489,233 | B1 | 11/2016 | Florissi et al. |
| 9,747,127 | B1 | 8/2017 | Florissi et al. |
| 9,747,128 | B1 | 8/2017 | Vijendra et al. |
| 9,996,662 | B1 | 6/2018 | Florissi et al. |
| 10,015,106 | B1 | 7/2018 | Florissi et al. |
| 2002/0073167 | A1 | 6/2002 | Powell et al. |
| 2005/0010712 | A1 | 1/2005 | Kim et al. |
| 2005/0102354 | A1 | 5/2005 | Hollenbeck et al. |
| 2005/0114476 | A1* | 5/2005 | Chen .................. H04L 67/1097 709/220 |
| 2006/0002383 | A1 | 1/2006 | Jeong et al. |
| 2006/0122927 | A1 | 6/2006 | Huberman et al. |
| 2007/0026426 | A1 | 2/2007 | Fuernkranz et al. |
| 2007/0076703 | A1 | 4/2007 | Yoneda et al. |
| 2007/0088703 | A1 | 4/2007 | Kasiolas et al. |
| 2008/0027954 | A1 | 1/2008 | Gan et al. |
| 2008/0028086 | A1 | 1/2008 | Chetuparambil et al. |
| 2008/0077607 | A1 | 3/2008 | Gatawood et al. |
| 2008/0279167 | A1 | 11/2008 | Cardei et al. |
| 2010/0076856 | A1 | 3/2010 | Mullins |
| 2010/0131639 | A1 | 5/2010 | Narayana et al. |
| 2010/0184093 | A1 | 7/2010 | Donovan et al. |
| 2010/0229178 | A1* | 9/2010 | Ito .......................... G06F 9/5083 718/104 |
| 2010/0290468 | A1 | 11/2010 | Lynam et al. |
| 2010/0299437 | A1 | 11/2010 | Moore |
| 2011/0020785 | A1 | 1/2011 | Lowery, Jr. et al. |
| 2011/0103364 | A1* | 5/2011 | Li ....................... H04J 13/0044 370/342 |
| 2011/0314002 | A1 | 12/2011 | Oliver et al. |
| 2012/0030599 | A1* | 2/2012 | Butt .................... H04L 41/0869 715/771 |
| 2013/0035956 | A1 | 2/2013 | Carmeli et al. |
| 2013/0194928 | A1* | 8/2013 | Iqbal ...................... H04L 47/70 370/235 |
| 2013/0246460 | A1 | 9/2013 | Maltbie et al. |
| 2013/0318257 | A1 | 11/2013 | Lee et al. |
| 2014/0012843 | A1 | 1/2014 | Soon-Shiong |
| 2014/0280363 | A1* | 9/2014 | Heng ................ G06F 17/30289 707/802 |
| 2014/0280604 | A1 | 9/2014 | Ahiska et al. |
| 2014/0280990 | A1 | 9/2014 | Dove et al. |
| 2014/0310718 | A1 | 10/2014 | Gerphagnon et al. |
| 2014/0325041 | A1 | 10/2014 | Xu et al. |
| 2014/0372611 | A1 | 12/2014 | Matsuda et al. |
| 2015/0019710 | A1* | 1/2015 | Shaashua .......... G06F 17/30705 709/224 |
| 2015/0088786 | A1 | 3/2015 | Anandhakrishnan |
| 2015/0178052 | A1 | 6/2015 | Gupta et al. |
| 2015/0269230 | A1 | 9/2015 | Kardes et al. |
| 2015/0295781 | A1 | 10/2015 | Maes |
| 2016/0072726 | A1 | 3/2016 | Soni et al. |
| 2016/0098021 | A1* | 4/2016 | Zornio ..................... G06F 17/30 700/47 |
| 2016/0179979 | A1* | 6/2016 | Aasman ............ G06F 17/30445 707/603 |
| 2016/0205106 | A1 | 7/2016 | Yacoub et al. |
| 2016/0267132 | A1* | 9/2016 | Castellanos ....... G06F 17/30132 |
| 2016/0337473 | A1 | 11/2016 | Rao |
| 2017/0032263 | A1 | 2/2017 | Yuan et al. |
| 2017/0187785 | A1 | 6/2017 | Johnson et al. |
| 2018/0054355 | A1 | 2/2018 | Balser et al. |

OTHER PUBLICATIONS

A.C. Murthy et al., "Apache Hadoop YARN: Moving beyond MapReduce and Batch Processing with Apache Hadoop 2," Addison-Wesley Professional, Mar. 29, 2014, 78 pages.

Global Alliance for Genomics and Health, "Beacons," https://genomicsandhealth.org/work-products-demonstration-projects/beacons, Jun. 27, 2014, 2 pages.

Data Working Group, "Global Alliance Genomics API," http://ga4gh.org/#/documentation, Dec. 28, 2015, 2 pages.

Aaron Krol, "Beacon Project Cracks the Door for Genomic Data Sharing," http://www.bio-itworld.com/2015/8/14/beacon-project-cracks-door-genomic-data-sharing.html, Aug. 14, 2015, 3 pages.

M.K. Gardner et al., "Parellel Genomic Sequence-Searching On An Ad-Hoc Grid: Experiences, Lessons Learned, and Implications," Proceedings of the 2006 ACM/IEEE SC/06 Conference, IEEE Computer Society, 2006, 14 pages.

A.G. Craig et al., "Ordering of Cosmid Clones Covering the Herpes Simplex Virus Type I (HSV-I) Genome: A Test Case For Fingerprinting By Hybridisation," Nucleic Acids Research, vol. 18, 1990, pp. 2653-2660.

U.S. Appl. No. 15/281,248 filed in the name of Patricia Gomes Soares Florissi et al., on Sep. 30, 2016 and entitled "Methods and Apparatus Implementing Data Model for Disease Monitoring, Characterization and Investigation."

P.P. Jayaraman et al., "Analytics-as-a-Service in a Multi-Cloud Environment Through Semantically-Enabled Hierarchical Data Processing," Software: Practice and Experience, Aug. 2017, pp. 1139-1156, vol. 47, No. 8.

J.Y.L. Lee et al., "Sufficiency Revisited: Rethinking Statistical Algorithms in the Big Data Era," The American Statistician, Dec. 15, 2016, 22 pages.

S. Wang et al., "Genome Privacy: Challenges, Technical Approaches to Mitigate Risk, and Ethical Considerations in the United States," Annals of the New York Academy of Sciences, Jan. 2017, pp. 73-83, vol. 1387, No. 1.

K. Xu et al., "Privacy-Preserving Machine Learning Algorithms for Big Data Systems," IEEE 35th International Conference on Distributed Computing Systems (ICDCS), Jun. 29-Jul. 2, 2015, pp. 318-327.

T.R. Golub et al., "Molecular classification of Cancer: Class Discovery and Class Prediction By Gene Expression Monitoring," Science, vol. 286, Oct. 15, 1999, pp. 531-537.

D. Singh et al., "Expression Correlates of Clinical Prostate Cancer Behavior," Cancer Cell, vol. 1, Mar. 2002, pp. 203-209.

U.S. Appl. No. 14/982,341 filed in the name of Patricia Gomes Soares Florissi et al., on Dec. 29, 2015 and entitled "Multi-Cluster Distributed Data Processing Platform."

U.S. Appl. No. 14/982,351 filed in the name of Patricia Gomes Soares Florissi et al., on Dec. 29, 2015 and entitled "Distributed Catalog Service for Multi-Cluster Data Processing Platform."

U.S. Appl. No. 15/395,340 filed in the name of Bryan Duerk et al., on Dec. 30, 2016 and entitled "Data-Driven Automation Mechanism for Analytics Workload Distribution."

Wikipedia, "Apache Spark," https://en.wikipedia.org/wiki/Apache_Spark, Apr. 10, 2017, 6 pages.

U.S. Appl. No. 15/485,843 filed in the name of Patricia Gomes Soares Florissi et al., on Apr. 12, 2017 and entitled "Scalable Distributed In-Memory Computation."

U.S. Appl. No. 15/582,743 filed in the name of Patricia Gomes Soares Florissi et al., on Apr. 30, 2017 and entitled "Scalable Distributed In-Memory Computation Utilizing Batch Mode Extensions."

Dell, "Dell Boomi Platform: Connect Every Part of Your Business to Transform How You do Business," https://marketing.boomi.com/rs/777-AVU-348/images/Boomi-Integration-Cloud.pdf, 2017, 4 pages.

X. Wu et al., "Privacy Preserving Data Mining Research: Current Status and Key Issues," Proceedings of the 7th International Conference on Computational Science, Part III: ICCS 2007, May 2007, pp. 762-772.

* cited by examiner

DISTRIBUTED ANALYTICS PLATFORM

PRIORITY CLAIM

The present application claims priority to U.S. Provisional Patent Application Ser. No. 62/193,059, filed Jul. 15, 2015 and entitled "IoT Analytics," and U.S. Provisional Patent Application Ser. No. 62/143,404, filed Apr. 6, 2015 and entitled "World Wide Hadoop Platform," both of which are incorporated by reference herein in their entirety.

FIELD

The field relates generally to information processing systems, and more particularly to information processing systems that implement distributed processing across a plurality of processing nodes.

BACKGROUND

In many information processing systems, data is collected from multiple sources and subject to various types of analytics processing. For example, in systems based on the Internet of Things (IoT), data from multiple remote devices is typically delivered to a central location for performance of various data analytics operations. These and other similar systems often assume that all of the data collected from the remote devices must be aggregated at one or more central locations in order to be analyzed, or that some minimal computation will be done at each remote device and the results of those computations will then be moved to one or more central locations for analytics. In either case, the analytics functionality is unduly limited by the need to move the data itself or results of remote computations to the central locations.

SUMMARY

Illustrative embodiments of the present invention provide distributed data processing platforms for advanced web scale analytics. For example, some embodiments are configured to permit analytics computations to be performed on data at each of a plurality of processing nodes along one or more data paths that the data traverses from its source to one or more destinations. In one or more of these embodiments, a distributed analytics platform provides a framework for orchestration and management of the computations over the multiple processing nodes of the data path. Some of these embodiments provide distributed analytics platforms for advanced web scale IoT analytics, although it is to be appreciated that other embodiments can be implemented outside of the IoT context.

In one embodiment, a method comprises receiving data from a data source at a first one of a plurality of distributed processing nodes of an analytics platform, performing one or more analytics operations on the data at the first processing node, updating the data at the first processing node based on results of the one or more analytics operations, and transmitting the updated data to another one of the processing nodes along a data path between the data source and a data destination. The performing, updating and transmitting are repeated for the other processing node and for one or more additional distributed processing nodes of the analytics platform along the data path. The analytics platform thereby performs distributed analytics processing on the data over multiple ones of the distributed processing nodes as the data moves through the data path from the data source to the data destination. The method is implemented by at least one processing device comprising a processor coupled to a memory.

By way of example, the distributed analytics platform may comprise a software-defined analytics platform in which the processing nodes are configured as part of the data path at least in part under software control of one or more processing devices. Other embodiments can be configured without the use of software-defined configuration functionality. Accordingly, distributed analytics platforms as disclosed herein are not limited to software-defined analytics platforms.

The updating of the data at a given one of the processing nodes can include updating based on analytics operations results that have been received in that processing node from one or more other processing nodes.

One or more of the illustrative embodiments provide significant advantages relative to conventional arrangements. For example, a distributed platform for advanced web scale analytics in some embodiments can more accurately and efficiently generate real-time or near-real-time predictive and actionable insights from IoT data and other types of Big Data originating from large numbers of potentially geographically-distributed data sources. These embodiments can operate at web scale but nonetheless can be configured to preserve security policies as well as other restrictions relating to governance, risk and compliance.

In addition, data movement and associated bandwidth requirements can be reduced by performing computations at multiple nodes along one or more data paths from a data source to one or more data destinations. Moreover, the analytics functionality provided by the distributed analytics platform can be abstracted and expanded not only horizontally along a given data path but also vertically over multiple levels of abstraction.

Such arrangements allow distributed analytics computations to be performed as close as possible to the corresponding data sources thereby allowing corresponding analytics insights to be obtained in as close to real-time as possible. For example, intermediate computations executed along the data path can then be shared immediately, as those computations are performed, allowing for faster detection of and response to adverse events.

These and other illustrative embodiments include, without limitation, methods, apparatus, systems, and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Figure 1:
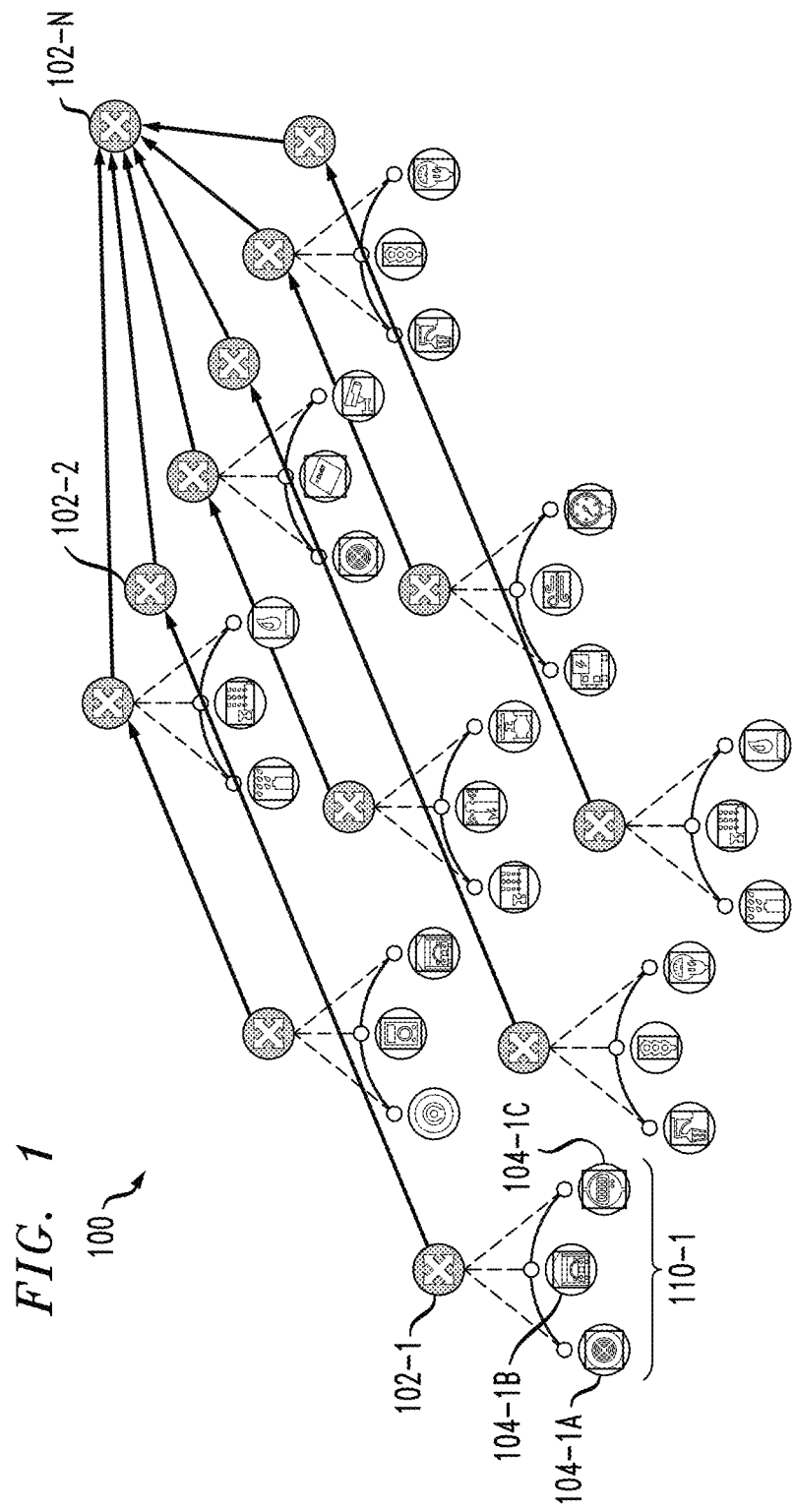
FIG. 1 shows a distributed analytics platform comprising a plurality of processing nodes in an illustrative embodiment of the invention.

FIG. 1 shows an information processing system 100 comprising a plurality of distributed processing nodes 102 collectively configured to provide a distributed analytics platform in an illustrative embodiment. The processing nodes 102 are individually denoted as 102-1, 102-2, ... 102-N. Some of the processing nodes 102 are each associated with one or more data source or data destination devices 104. For example, processing node 102-1 is associated with a set 110-1 of multiple data source or data destination devices 104 including data source or data destination devices individually denoted as 104-1A, 104-1B and 104-1C. At least a subset of the data source or data destination devices 104 illustratively comprise respective IoT devices, although data source or destination devices 104 can additionally or alternatively comprise desktop computers, laptop computers, tablet computers, mobile telephones or other types of communication devices or other processing devices in any combination. More particular examples of IoT devices that can be used as data sources or data destinations in illustrative embodiments will be described below in conjunction with FIG. 3.

It should therefore be appreciated that a given one of the devices 104 can comprise a data source device, a data destination device, or a combination of both a data source device and a data destination device. For example, the same device can be a data source for one data path of the system 100 and a data destination for another data path of the system.

One example of a data path in the system 100 is the data path from processing node 102-1 through processing nodes 102-2 and 102-N. Numerous other data paths are present in the system 100.

In the distributed analytics platform provided by the processing nodes 102, data from a given data source is received at a first one of the processing nodes. One or more analytics operations are performed on the data at the first processing node, and the data is updated at the first processing node based on results of the one or more analytics operations. The updated data is transmitted to another one of the processing nodes along a data path between the data source and a data destination. This may be repeated for the other processing node and possibly for one or more additional distributed processing nodes 102 of the analytics platform along the data path. The analytics platform thereby performs distributed analytics processing on the data over multiple distributed processing nodes as the data moves through the data path from the data source to the data destination.

The processing nodes 102 are also referred to in conjunction with some embodiments herein as "data nodes." It should be understood that the term "processing node" as used herein is intended to be broadly construed so as to encompass a data node or other type of node configured to process data as it moves along a data path from a data source to a data destination.

In the FIG. 1 embodiment, the processing nodes 102 are illustratively arranged in single layer, but other embodiments can include multiple interconnected layers of distributed processing nodes. A wide variety of other arrangements of one or more layers of processing nodes 102 can be used in other embodiments. For example, the processing nodes in some embodiments are arranged in multiple distributed processing node clusters associated with respective distinct geographic regions or other types of data zones.

Each of the processing nodes 102 of the distributed analytics platform communicates either directly or indirectly with additional ones of the processing nodes over one or more networks that are not explicitly shown in the figure.

The processing nodes 102 in some embodiments are illustratively implemented as respective worldwide data nodes, and more particularly as respective worldwide Hadoop (WWH) nodes, although numerous alternative processing node types can be used in other embodiments. The WWH nodes in such an embodiment are assumed to be configured to perform analytics operations in accordance with any processing framework supported by an Apache Hadoop YARN ("Yet Another Resource Negotiator") cluster on data received from one or more other ones of the WWH nodes. Examples of frameworks supported by the Hadoop YARN platform include MapReduce, Spark, Hive, MPI and numerous others. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein.

In some embodiments, the processing nodes 102 collectively implement a distributed analytics platform that is more particularly in the form of a multi-cluster distributed data processing platform. Such a platform may comprise a WWH platform that includes a plurality of potentially geographically-distributed YARN clusters each comprising a corresponding cluster of distributed data processing nodes. The WWH platform is illustratively configured for worldwide scale, geographically-dispersed computations and other types of cluster-based processing based on locally-accessible data resources.

The acronym WWH as used herein is additionally or alternatively intended to refer to a "worldwide herd" arrangement where the term "herd" in this context illustratively connotes multiple geographically-distributed Hadoop platforms. More generally, WWH is used to denote a worldwide data processing platform potentially comprising multiple clusters.

Additional details regarding WWH platforms that can be used in the FIG. 1 embodiment and other embodiments of the present invention are disclosed in U.S. patent application Ser. No. 14/982,341, filed Dec. 29, 2015 and entitled "Multi-Cluster Distributed Data Processing Platform," and U.S. patent application Ser. No. 14/982,351, filed Dec. 29, 2015 and entitled "Distributed Catalog Service for Multi-Cluster Data Processing Platform," both commonly assigned herewith and incorporated by reference herein.

Illustrative embodiments disclosed in these two patent applications provide information processing systems that are configured to execute distributed applications over multiple distributed data processing node clusters associated with respective distinct data zones. Each data zone in a given embodiment illustratively comprises a Hadoop YARN cluster configured to support multiple distributed data processing frameworks, such as MapReduce and Spark. These and other similar arrangements disclosed herein can be advantageously configured to provide analytics functionality in a decentralized and privacy-preserving manner, so as to overcome the above-noted drawbacks of conventional systems. This is achieved in some embodiments by orchestrating execution of distributed applications across the multiple YARN clusters. Computations associated with data available locally within a given YARN cluster are performed within that cluster. Accordingly, instead of moving data from local sites to a centralized site, computations are performed within the local sites where the needed data is available. This provides significant advantages in terms of both performance and privacy. Additional advantages are provided in terms of security, governance, risk and compliance.

In one embodiment, a method comprises initiating a first application in a first one of a plurality of distributed processing node clusters associated with respective data zones, each of the clusters being configured to perform processing operations utilizing local data resources locally accessible within its corresponding data zone, and determining a plurality of data resources to be utilized by the application. The method further includes identifying for each of the plurality of data resources to be utilized by the application whether the data resource is a local data resource that is locally accessible within the data zone of the first distributed processing node cluster or a remote data resource that is not locally accessible within the data zone of the first distributed processing node cluster.

For one or more of the plurality of data resources that are identified as local data resources, processing operations are performed utilizing the local data resources in the first cluster in accordance with the first application.

For one or more of the plurality of data resources that are identified as remote data resources, respective additional applications are initiated in one or more additional ones of the plurality of distributed processing node clusters and processing operations are performed utilizing the remote data resources in the corresponding one or more additional clusters in accordance with the one or more additional applications.

The process is repeated recursively for each additional application until all processing required by the first application is complete.

Processing results from the first cluster and the one or more additional clusters are aggregated and the aggregated processing results are provided to a client.

In another embodiment, a method comprises implementing a first portion of a distributed catalog service for a given one of a plurality of distributed processing node clusters associated with respective data zones, each of the clusters being configured to perform processing operations utilizing local data resources locally accessible within its corresponding data zone. The method further comprises receiving in the first portion of the distributed catalog service a request to identify for each of a plurality of data resources to be utilized by an application initiated in the given cluster whether the data resource is a local data resource or a remote data resource relative to the given cluster, and providing from the first portion of the distributed catalog service a response to the request. The first portion of the distributed catalog service in combination with additional portions implemented for respective additional ones of the plurality of distributed processing node clusters collectively provide the distributed catalog service with capability to resolve local or remote status of data resources in the data zones of each of the clusters responsive to requests from any other one of the clusters.

In an embodiment that is based on a WWH platform, each of at least a subset of the processing nodes of the platform can comprise a WWH node, with a distributed WWH catalog service being utilized to define and configure the data paths and the roles of each of the WWH nodes along a given data path. The WWH platform in an embodiment of this type provides an execution framework to orchestrate the execution of individual analytics-related processing tasks on each of the WWH nodes.

It is to be appreciated that a wide variety of other types of processing nodes 102 can be used in other embodiments. Accordingly, the use of WWH nodes in certain embodiments described above is by way of illustrative example only, and should not be construed as limiting in any way.

For example, additional or alternative types of processing node functionality that may be incorporated in at least a subset of the processing nodes of an information processing system in illustrative embodiments are described in U.S. Pat. No. 9,020,802, entitled "Worldwide Distributed Architecture Model and Management," and U.S. Pat. No. 9,158,843, entitled "Addressing Mechanism for Data at World Wide Scale," which are commonly assigned herewith and incorporated by reference herein.

At least a subset of the processing nodes 102 or data source or destination devices 104 in the system 100 of FIG. 1 may comprise or be otherwise associated with respective clients. By way of example, such clients may comprise one or more desktop computers, laptop computers, tablet computers, mobile telephones or other types of communication devices or other processing devices in any combination.

The variable N used in FIG. 1 denotes an arbitrary value, as embodiments of the invention can be configured using any desired number of processing nodes 102. Numerous alternative arrangements are possible, including embodiments in which a single system element combines functionality of at least a portion of a processing node and functionality of at least a portion of a data source or destination device. Thus, alternative embodiments in which the functions of a processing node and a data source device or a data destination device are at least partially combined into a common processing entity are possible.

The processing nodes 102 in some embodiments are implemented at least in part as respective analysis nodes. The analysis nodes may comprise respective computers in a cluster of computers associated with a supercomputer or other high performance computing (HPC) system. The term "processing node" as used herein is intended to be broadly construed, and such nodes in some embodiments may comprise respective compute nodes in addition to or in place of providing analysis node functionality.

The system 100 may include additional nodes that are not explicitly shown in the figure. For example, the system 100 may comprise one or more name nodes. Such name nodes may comprise respective name nodes of a Hadoop Distributed File System (HDFS), although other types of name nodes can be used in other embodiments. Particular objects or other stored data of a storage platform can be made accessible to one or more of the processing nodes 102 via a corresponding name node. For example, such name nodes can be utilized to allow the processing nodes 102 to address multiple HDFS namespaces within the system 100.

Each of the processing nodes 102 is assumed to comprise or otherwise have access to one or more databases for storing results of analytics operations and additional or alternative types of data.

Databases associated with the processing nodes 102 and possibly other elements of the information processing system 100 can be implemented using one or more storage platforms. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage arrays such as VNX® and Symmetrix VMAX® storage arrays, both commercially available from EMC Corporation. Other types of storage products that can be used in implementing a given storage platform in an illustrative embodiment include software-defined storage products such as ScaleIO™ and ViPR®, server-based flash storage devices such as DSSD™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

Additionally or alternatively, a given storage platform can implement multiple storage tiers. For example, a storage platform can comprise a 2 TIERS™ storage system from EMC Corporation.

These and other storage platforms can be part of what is more generally referred to herein as a processing platform comprising one or more processing devices each comprising a processor coupled to a memory.

A given processing device may be implemented at least in part utilizing one or more virtual machines or other types of virtualization infrastructure such as Docker containers or other types of Linux containers (LXCs). The processing nodes 102 and data source or data destination devices 104, as well as other system components, may be implemented at least in part using processing devices of such processing platforms.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It is to be appreciated that the particular arrangement of system elements shown in FIG. 1 is for purposes of illustration only, and that other arrangements of additional or alternative elements can be used in other embodiments. For example, numerous alternative information processing system configurations can be used to implement distributed analytics functionality as disclosed herein.

The operation of the system 100 will now be described in further detail with reference to the flow diagram of FIG. 2. The process as shown includes steps 200 through 210, and is suitable for use in the system 100 but is more generally applicable to other types of distributed analytics platforms.

In step 200, data is received from a data source at a first one of a plurality of distributed processing nodes of an analytics platform. With reference to the FIG. 1 embodiment, data is received at one of the distributed processing nodes 102 from one of the devices 104 operating as a data source. The data may be received directly from the data source or indirectly via one or more other processing nodes 102.

In step 202, one or more analytics operations are performed on the data at the first processing node. For example, the one or more analytics operations performed by a given one of the processing nodes may include at least one of a user-defined function and a function selected from a catalog of available functions. Numerous other types of analytics operations can be performed in other embodiments.

In step 204, the data is updated at the first processing node based on results of the one or more analytics operations. This updating can involve, for example, combining the data with additional data previously received from other processing nodes or data sources of the system and stored by the first processing node.

More particularly, updating the data based on results of the one or more analytics operations may comprise at least one of combining the data with data from one or more other data paths, replacing at least a portion of the data with data from one or more other data paths, and modifying at least a portion of the data based at least in part on the data from one or more other data paths.

As additional examples, updating the data based on results of the one or more analytics operations may include one or more of adding metadata to the data, modifying existing metadata of the data, and transforming the data into a different format.

Various combinations of these and additional or alternative types of updating can be performed on data by one or more processing nodes of the distributed analytics platform.

For example, in some embodiments, the updating may illustratively involve combining the data with additional data from one or more social media applications, or otherwise modifying the data using the additional data from the one or more social media applications.

A given analytics operation performed at a particular one of the processing nodes may be configured to utilize local information available to that processing node within a corresponding local data zone.

In step 206, the updated data is transmitted to another one of the processing nodes along a data path between the data source and a data destination. The data path may be determined by the distributed analytics platform as at least a portion of an inverse spanning tree.

It should be noted that each of at least a subset of the distributed processing nodes may be a part of multiple distinct data paths and may be configured to perform distinct analytics operations for different ones of the data paths such that a role of a given one of the processing nodes in the analytics platform varies based at least in part on the particular data path over which data is received for processing.

For example, the plurality of distributed processing nodes of the analytics platform may be arranged in multiple distinct abstraction levels with each such level implementing a different type of analytics functionality.

Also, the analytics platform may be configured to optimize the configuration of the data path and its associated processing nodes for one or more specified parameters relating to transmission of the data from the data source to the data destination including one or more of speed, bandwidth, cost and compliance.

In step 208, steps 202, 204 and 206 are repeated for each of one or more other processing nodes along the data path until the data destination is reached.

In step 210, the process is terminated when the data being transmitted along the data path reaches the data destination.

The updating of the data at a given one of the processing nodes can include updating based on analytics operations results that have been received in that processing node from one or more other processing nodes.

Figure 2:
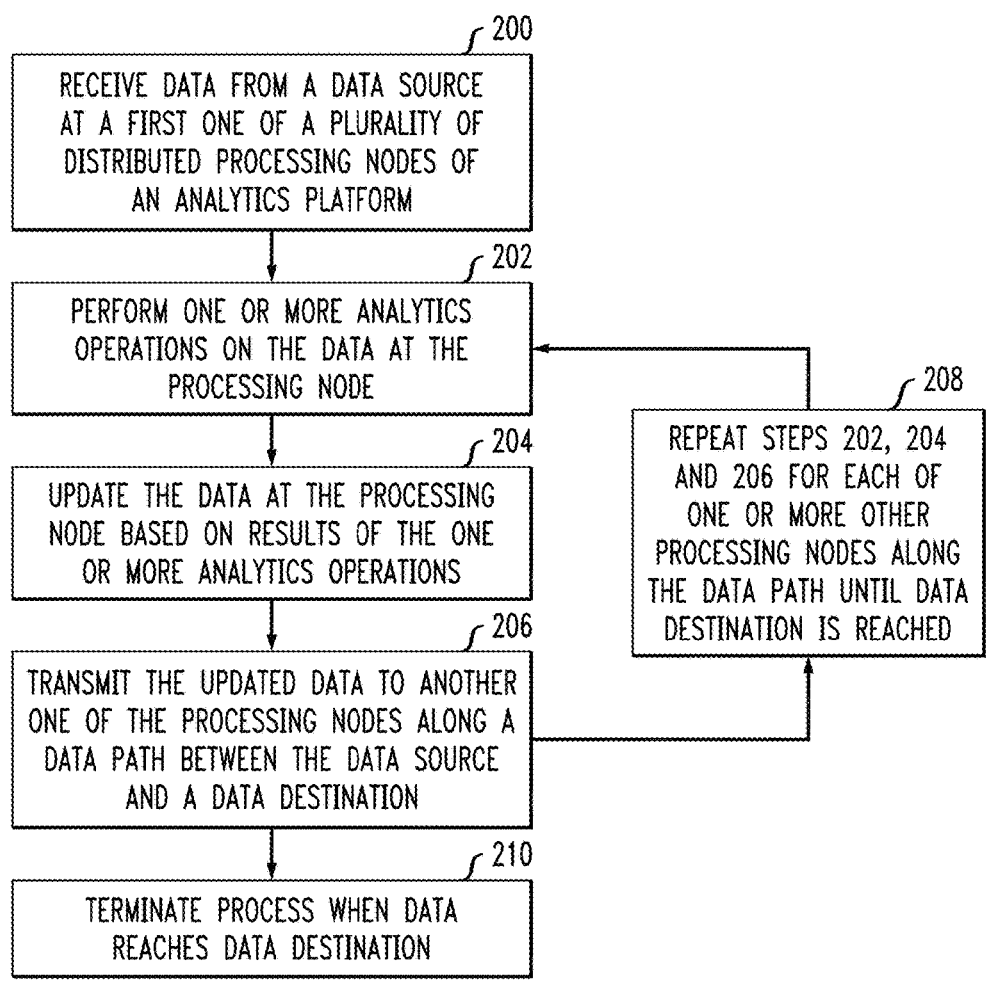
FIG. 2 is a flow diagram of an exemplary process implemented in the distributed analytics platform of FIG. 1.

A distributed analytics platform implementing the FIG. 2 process performs distributed analytics processing on the data over multiple ones of the distributed processing nodes as the data moves through the data path from the data source to the data destination.

In some embodiments, the analytics platform comprises a software-defined analytics platform in which the processing nodes are configured as part of the data path at least in part under software control.

Additionally or alternatively, the distributed processing nodes of the analytics platform may comprise a plurality of distributed processing node clusters associated with respective data zones, with each of the clusters being configured to perform analytics operations utilizing local data resources locally accessible within its corresponding data zone. In such an embodiment, the plurality of distributed processing node clusters may more particularly comprise respective YARN clusters.

In such an embodiment, the identification of the local or remote status of particular data resources that may be utilized in conjunction with performance of an analytics operation illustratively involves accessing a distributed catalog service to identify for each of a plurality of data resources to be utilized by a given processing node whether the data resource is a local data resource or a remote data resource. The distributed catalog service is illustratively distributed over the clusters with each of the clusters having visibility of a corresponding distinct portion of the distributed catalog based on its locally accessible data resources. In some embodiments, the distributed catalog service comprises a distributed WWH catalog having a corresponding instance implemented within each of the clusters.

At various points in the FIG. 2 process, analytics processing results from multiple ones of the processing nodes can be aggregated and provided to a client.

For example, intermediate analytics results can be aggregated and provided to a client based at least in part on intermediate analytics operations performed at respective intermediate ones of the processing nodes that are part of the data path between the data source and the data destination.

Such aggregated processing results are advantageously configured to preserve privacy of the corresponding processing nodes in their respective local data resources. For example, the processing results from a given one of the processing nodes may be permitted to be transmitted to another one of the processing nodes but the corresponding local data resources of the given processing node that are utilized to obtain the transmitted processing results are not permitted to be transmitted to another one of the processing nodes. Similar advantages are provided with regard to other aspects of data protection, including data security.

In some embodiments, a distributed analytics platform is configured to leverage Big Data profiles and associated Big Data analytics in processing local and remote data resources across multiple geographic regions or other types of data zones.

Such embodiments include, for example, distributed analytics platforms configured to provide advanced web-scale IoT analytics that gain real-time, predictive and actionable insights from IoT and Big Data.

Additional details regarding Big Data profiles and associated Big Data analytics that can be implemented in illustrative embodiments of the present invention are described in U.S. Pat. No. 9,031,992, entitled "Analyzing Big Data," which is commonly assigned herewith and incorporated by reference herein.

A distributed analytics platform in an illustrative embodiment can utilize the data scattered across multiple regional data centers located worldwide, while preserving data privacy and adjusting for differences in data formats and other factors between the various data centers. Such a platform in some embodiments leverages one or more frameworks supported by Hadoop YARN, such as MapReduce, Spark, Hive, MPI and numerous others, to support distributed computations while also minimizing data movement, adhering to bandwidth constraints in terms of speed, capacity and cost, and satisfying security policies as well as policies relating to governance, risk management and compliance.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing multi-cluster distributed data processing functionality. For example, the ordering of the process steps may be varied in other embodiments, or certain steps may be performed concurrently with one another rather than serially. Also, one or more of the process steps may be repeated periodically for different types of analytics functionality, or multiple instances of the process can be performed in parallel with one another on different WWH platforms or other types of platforms implemented within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

As mentioned previously, data source or destination devices in some embodiments comprise respective IoT devices. It is also possible that a given data source or data destination may comprise multiple IoT devices.

An IoT device generally comprises a sensor that has the ability to monitor and measure a set of properties of its surroundings, and a mechanism to make these measurements available to other system entities.

Figure 3:
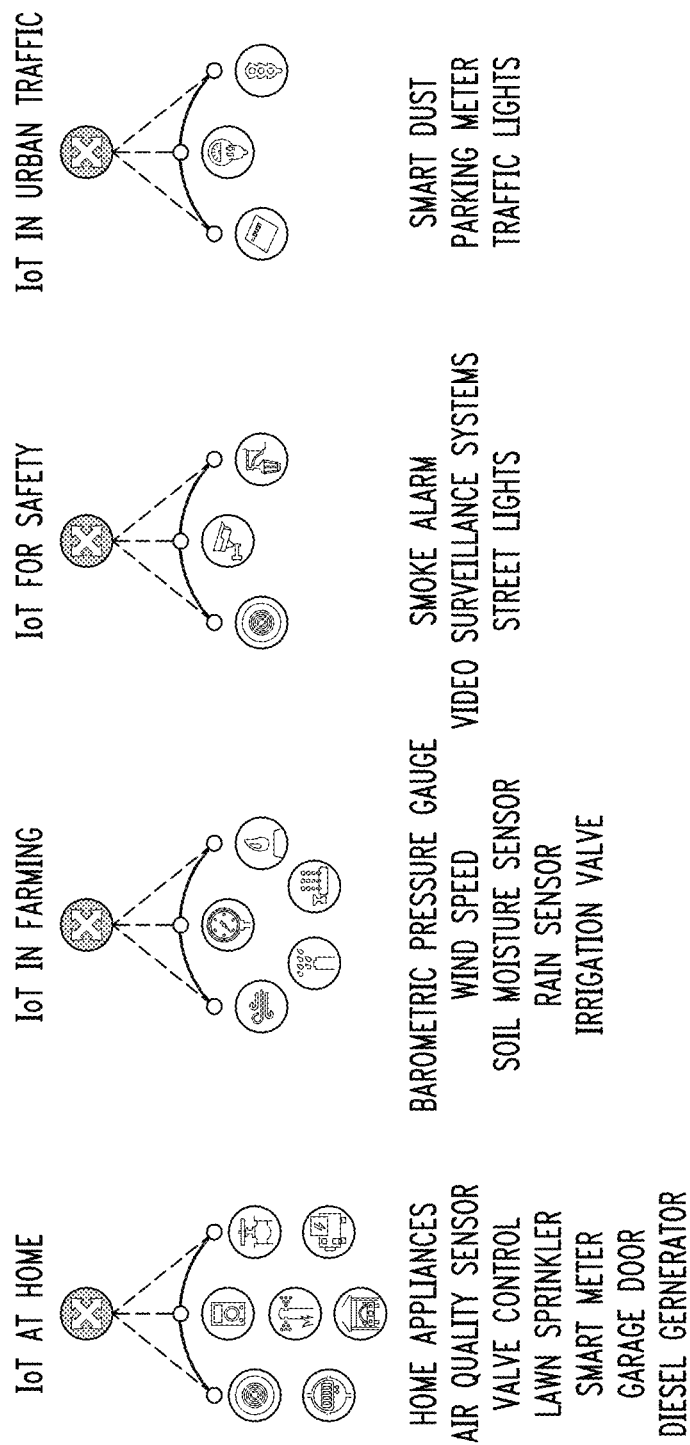
FIG. 3 shows examples of IoT devices that are part of distributed analytics platforms in illustrative embodiments.

FIG. 3 shows a number of different examples of IoT devices that may be part of distributed analytics platforms in illustrative embodiments. These example IoT devices include IoT devices utilized at home, such as home appliances, air quality sensors, valve controls, lawn sprinklers, smart meters, garage doors and diesel generators, IoT devices utilized in farming, such as barometric pressure gauges, wind speed sensors, soil moisture sensors, rain sensors and irrigation valves, IoT devices for safety, such as smoke alarms, video surveillance systems and street lights, and IoT devices utilized in urban traffic control, such as smart dust, parking meters and traffic lights. It is to be appreciated, however, that these example devices are provided for illustration purposes only, and should not be construed as limiting in any way. Other embodiments can utilize additional or alternative IoT devices. Moreover, numerous embodiments can be configured without use of IoT devices. Accordingly, distributed analytics platforms as disclosed herein can provide generic frameworks suitable for use with any desired arrangement of data source and data destination devices.

For example, data sources can illustratively include simple IoT devices that measure and collect respective single parameters, aggregators of parameters from multiple IoT devices, or even an entire computing cluster, such as a Hadoop cluster, that may be performing a complex computation on data and generating more data as a result.

Also by way of example, data destinations can include any type of device capable of receiving data. This illustratively includes various types of data consumers, including computers, mobile telephones, wearable devices, Hadoop clusters, and applications that listen to the data flow of a given data path.

Intermediate data nodes along a data path can illustratively include a wide variety of different types of data transformers, which can be configured to transform received data in some way before allowing the data to move along the data path. Such transformations can include adding contextual data such as time and location, cleaning the data, formatting the data in some way, aggregating the data with other data, or performing stream computations or other types of analysis operations.

Any of a number of different techniques can be used to connect data sources to data destinations. These include, for example, various non-automated arrangements in which a data source may be made known to some entity, and this entity then becomes interested in receiving the data and starts listening to any data coming from that source. Alternatively, an entity may be interested in data of a certain data type and then tries to discover one or more sources of data for that particular data type. Automated arrangements may also be used, such as, for example, arrangements in which a data source may publish in a data market or on a web site that it will now start monitoring a certain entity and will make available the results obtained. The data source may offer any mechanism for other entities to actually receive the data. Alternatively, a data destination may listen to sites where data sources are published and then may automatically connect to new sources.

Once any data source is connected to any data destination, a data path may be created between them in different ways. For example, one mechanism for creating such data paths may involve determining a shortest path, where the distance between nodes in the path may be measured by bandwidth, physical distance or other measures.

The choice of the path may be done in such a way to maximize the use of any existing tree path between the source and the destination.

In some embodiments, the data paths are determined using software-defined networks comprising sets of distributed processing nodes configured under software control.

Each node on a given data path can perform computations on the data received and may change the data as the data traverses the tree from its source to its destination.

Additionally or alternatively, each node on the data path may become the source for a new data stream. For example, a given data node may become a source for a new data stream generated as the result of the computation done on top of several data sources, or it may be a data source in and of itself.

It was noted above that a given distributed analytics platform as disclosed herein can include a wide variety of different arrangements of processing nodes. Additional examples of at least portions of such platforms are shown in FIGS. 4 and 5.

Figure 4:
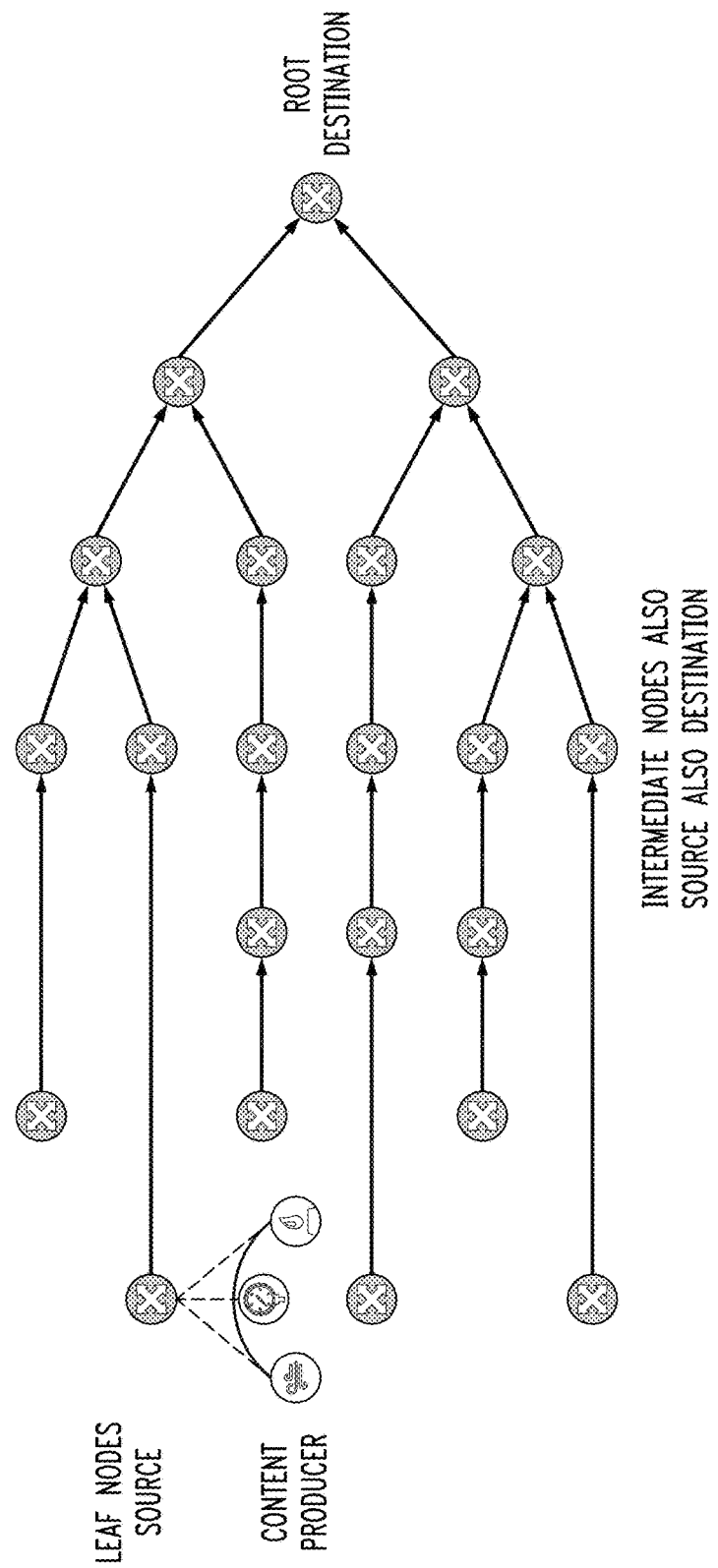
FIGS. 4 and 5 show additional examples of distributed analytics platforms in illustrative embodiments.

Referring now to FIG. 4, a distributed analytics platform comprises a set of data paths in the form of a tree interconnecting various ones of the processing nodes, also referred to in this and other embodiments as "data nodes." The data sources in this embodiment illustratively comprise respective leaf nodes of the tree, and the data destination illustratively comprises a root node of the tree, also referred to as a root destination. One or more intermediate nodes of the tree can also serve as data sources or data destinations for other data paths supported by the distributed analytics platform.

Figure 5:
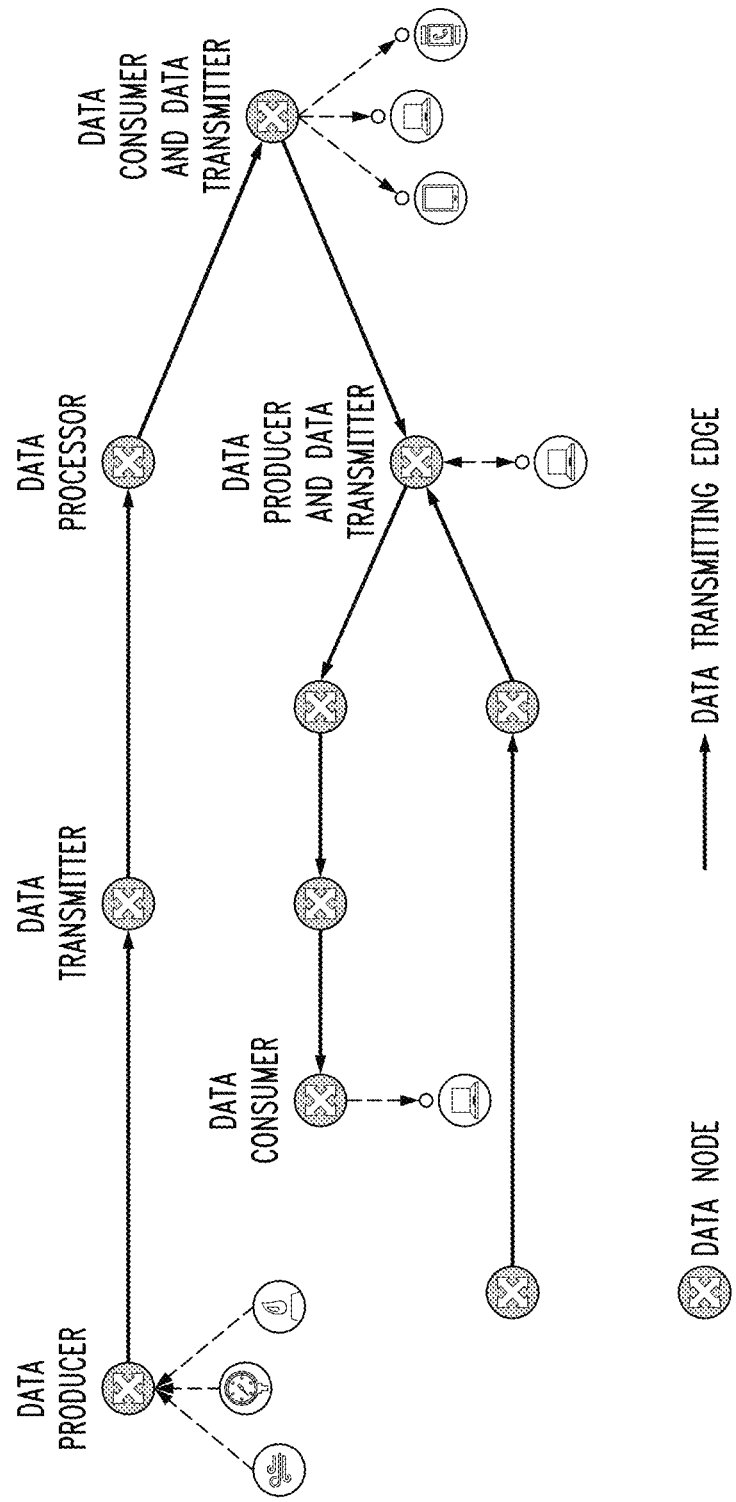

Another example of a distributed analytics platform in FIG. 5 illustrates various roles that one or more of the data nodes may have, including roles as data producer, data transmitter, data processor and data consumer. Data transmitting edges between the various nodes are also shown. Some of the data nodes in this example take on multiple roles, such as roles of data producer and data transmitter, or roles of data consumer and data transmitter. Numerous alternative combinations of roles are possible for a given data node. For example, as noted above, a given data node can modify received data based on additional data obtained from one or more social media applications.

As is apparent from the embodiments of FIGS. 1, 4 and 5, data in these distributed analytics platforms flows from potentially large numbers of IoT devices or other data sources to what are typically relatively smaller numbers of data destinations. Accordingly, in some embodiments, the number of data sources may be much larger than the number of data destinations. This is in contrast to conventional content delivery network scenarios in which content is typically delivered from a relatively small number of data sources, such as a set of centralized web servers, to a relatively large number of data destinations, such as mobile telephones or computers of the content consumers. Moreover, in many IoT scenarios, the characteristics of the data that flows over the data paths is quite different. For example, the data in many cases can tolerate loss or can exhibit a high level of burstiness. Illustrative embodiments herein transform the data along the data path, such that the data that reaches a given destination represents a modified version of the data based on analytics-related computations performed at one or more data nodes along the data path between the data source and the data destination.

Additional details regarding example data paths in illustrative embodiments will now be described with reference to FIGS. 6 through 17.

Figure 6:
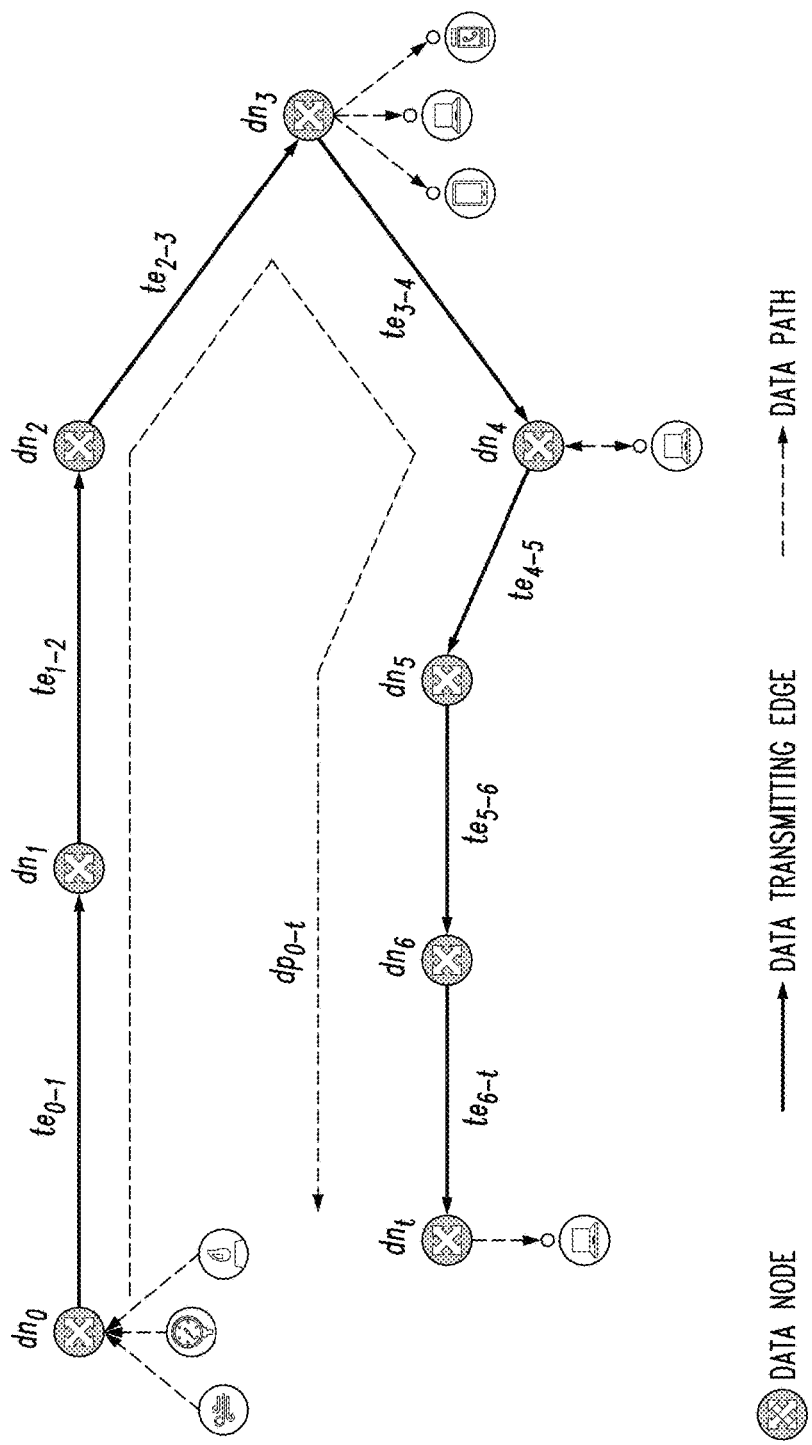
FIG. 6 illustrates a data path in one embodiment.

With reference to FIG. 6, an example data path is shown which comprises a sequence of hops between data nodes. Data paths in these and other examples herein are denoted "dp" with subscripts that indicate the respective data source and data destination. The data transmitting edges are denoted "te" with subscripts that denote the respective beginning and ending data nodes of the data transmitting edge. The data nodes are also denoted "dn" and include identifying subscripts. For example, the data path dpo-t denotes a data path between a data source corresponding to data node $dn_0$ and a data destination corresponding to data node dnt.

Figure 7:
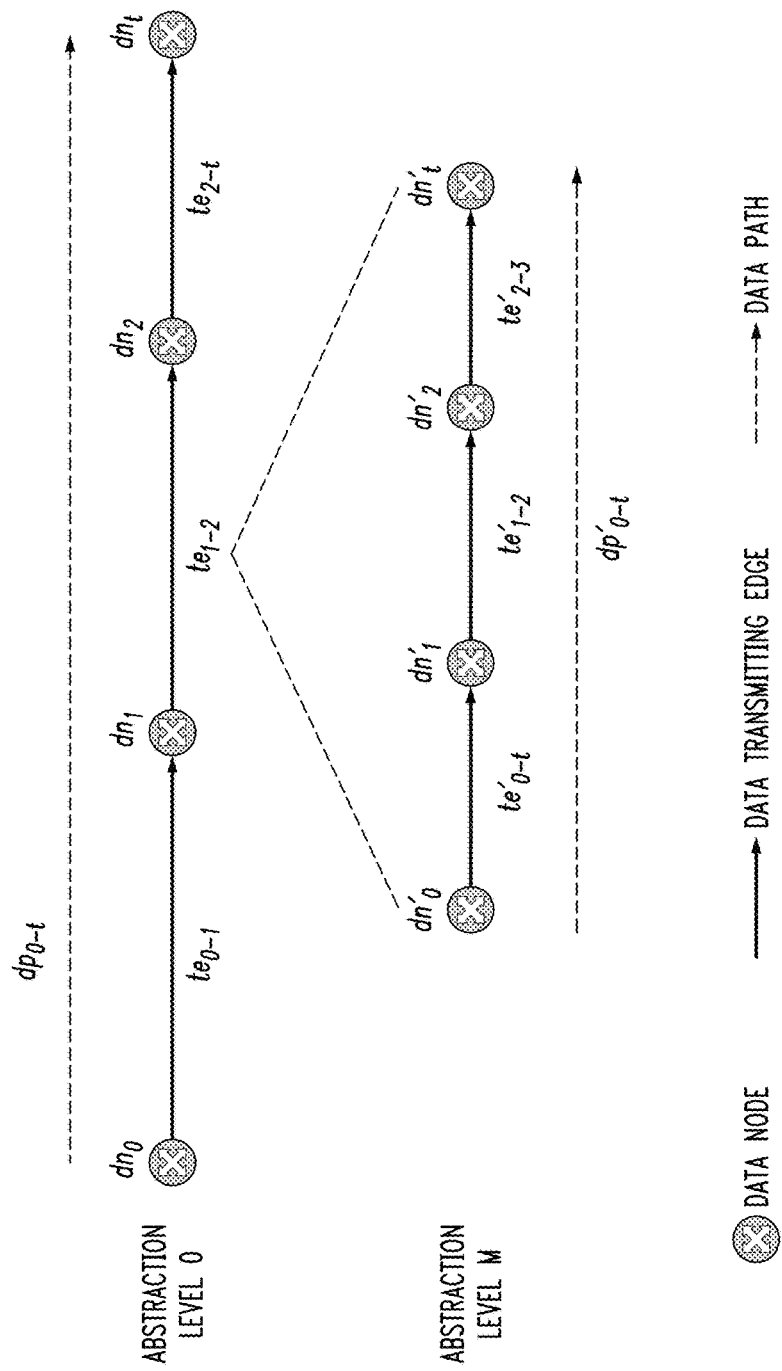
FIG. 7 illustrates multiple levels of abstraction of data paths and associated processing nodes in one embodiment of a distributed analytics platform.

As illustrated in FIG. 7, data paths and their associated data nodes can be characterized by multiple levels of abstraction. Thus, a data path dpo-t at Abstraction Level 0 has a different level of detail than a related data path at Abstraction Level M. For example, the related data path at Abstraction Level M reveals the presence of a plurality of additional data nodes between data nodes $dn_1$ and $dn_2$, and thus provides a higher level of detail for that portion of the data path dpo-t of Abstraction Level 0. This example serves to illustrate that a data path or a particular hop of that data path can be viewed at multiple levels of abstraction, including the highest level of abstraction as a single entity from source to destination, or it can be viewed at a more detailed level of abstraction where another level of granularity is shown in terms of the hops that comprise the data path.

It is therefore apparent that a given data path of a distributed analytics platform as disclosed herein can comprise a collection of other data paths. This is a recursive concept and can span multiple levels of abstraction.

Figure 8:
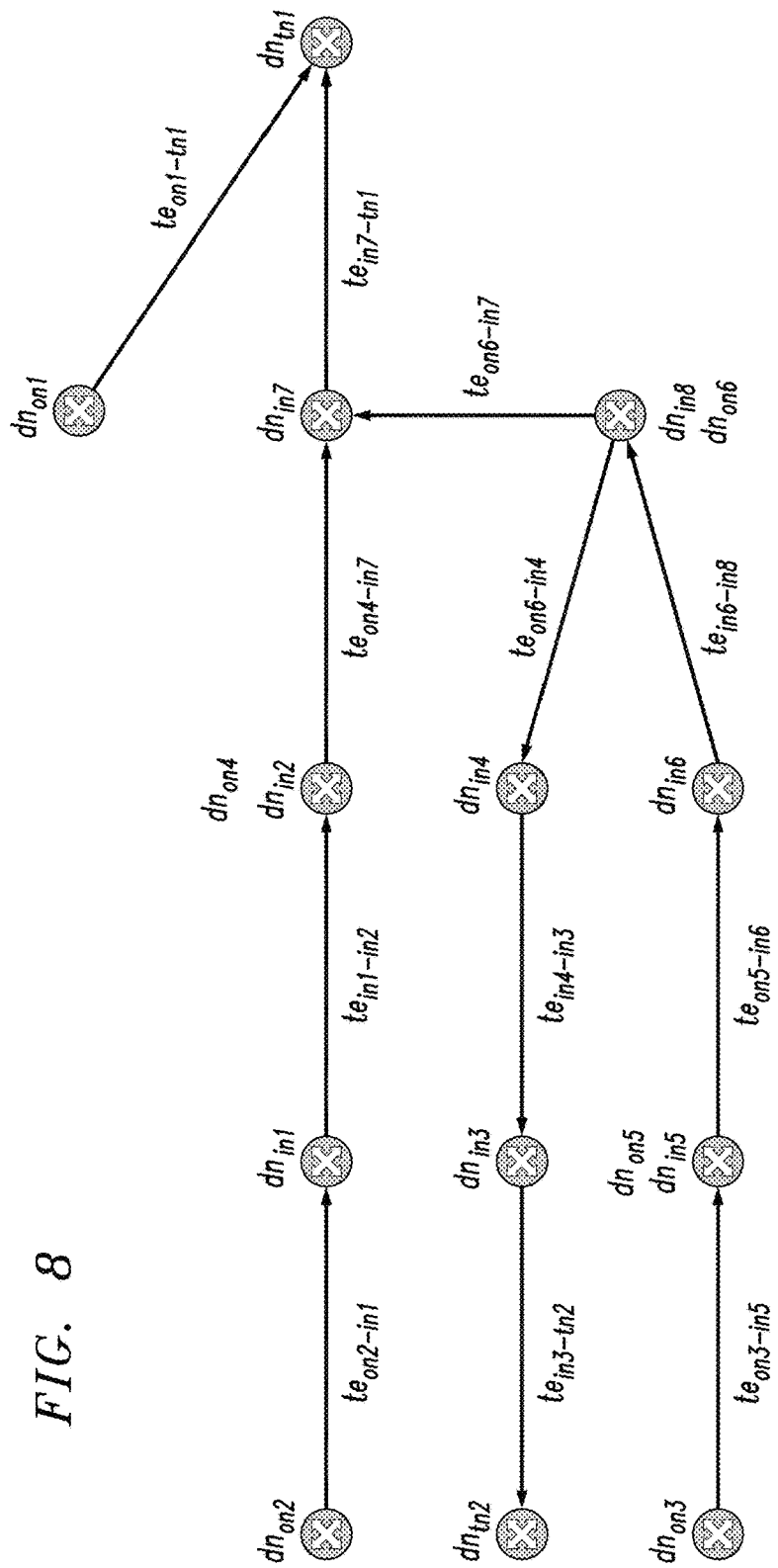
FIG. 8 shows an example of a set of data paths in one embodiment.
Figure 9:
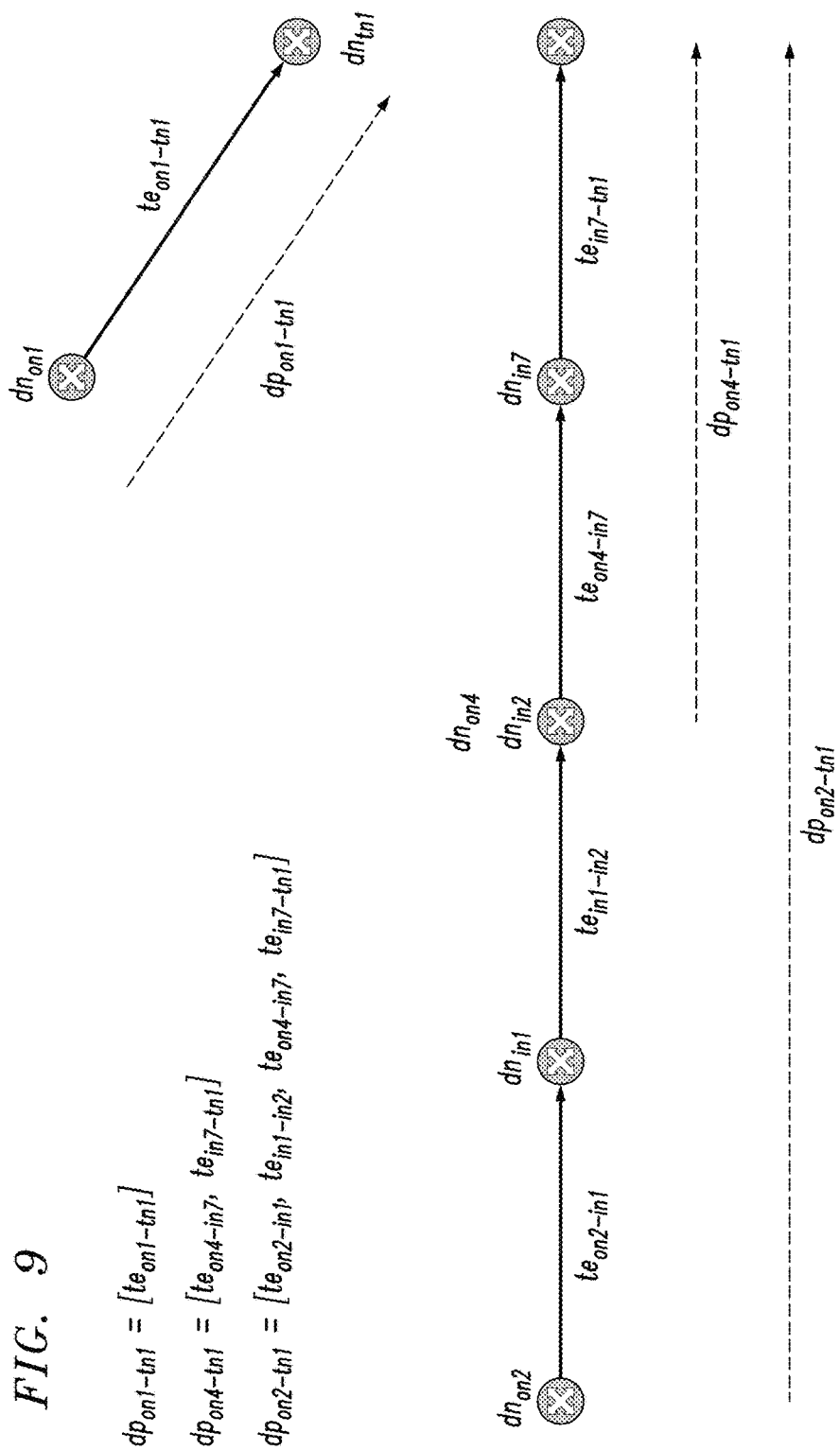
FIGS. 9 and 10 show additional data path examples in other embodiments.
Figure 10:
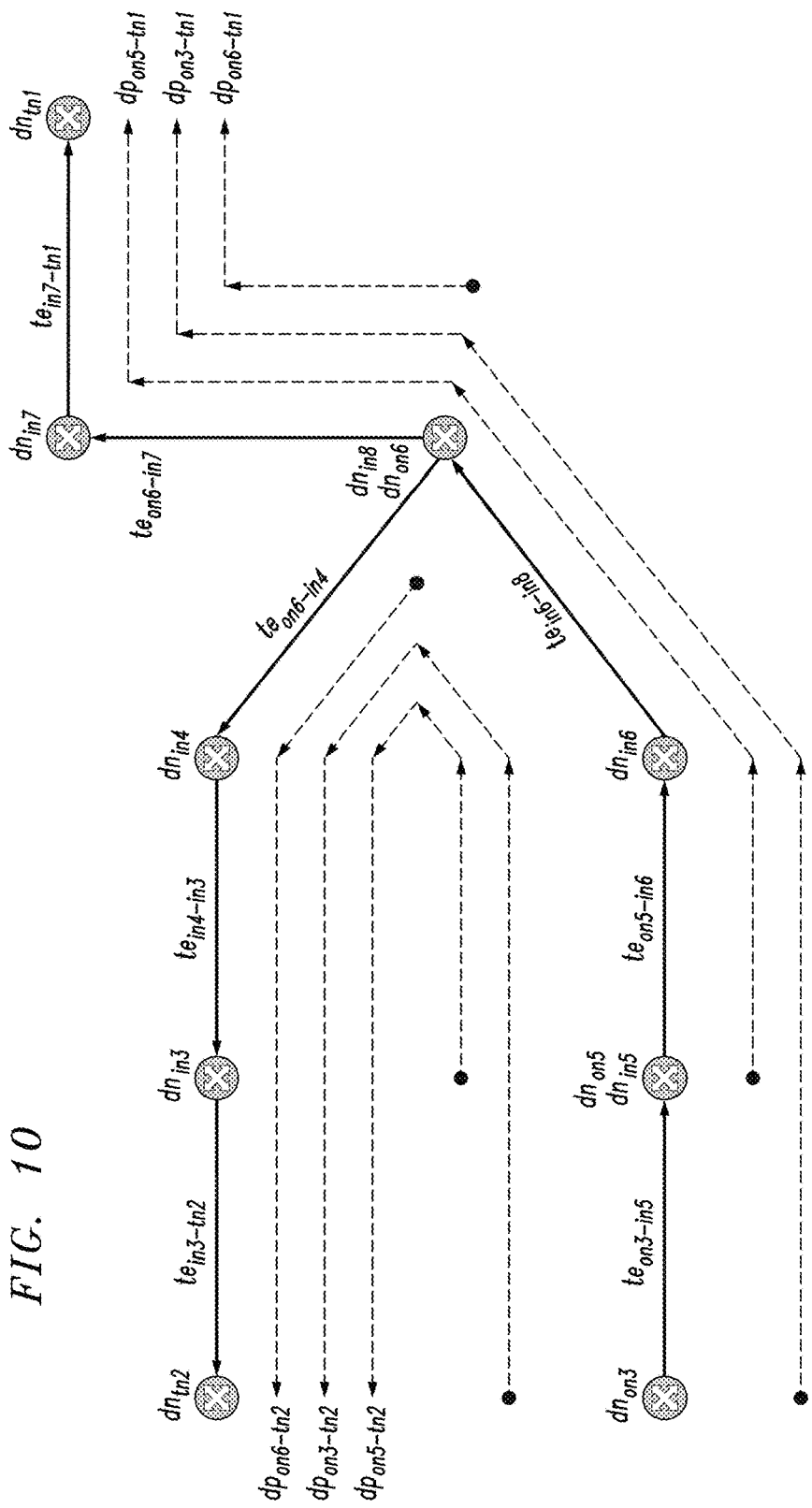

Other examples of data paths in illustrative embodiments are shown in FIGS. 8, 9 and 10. Again, these are just examples, and should not be viewed as limiting in any way.

Figure 11:
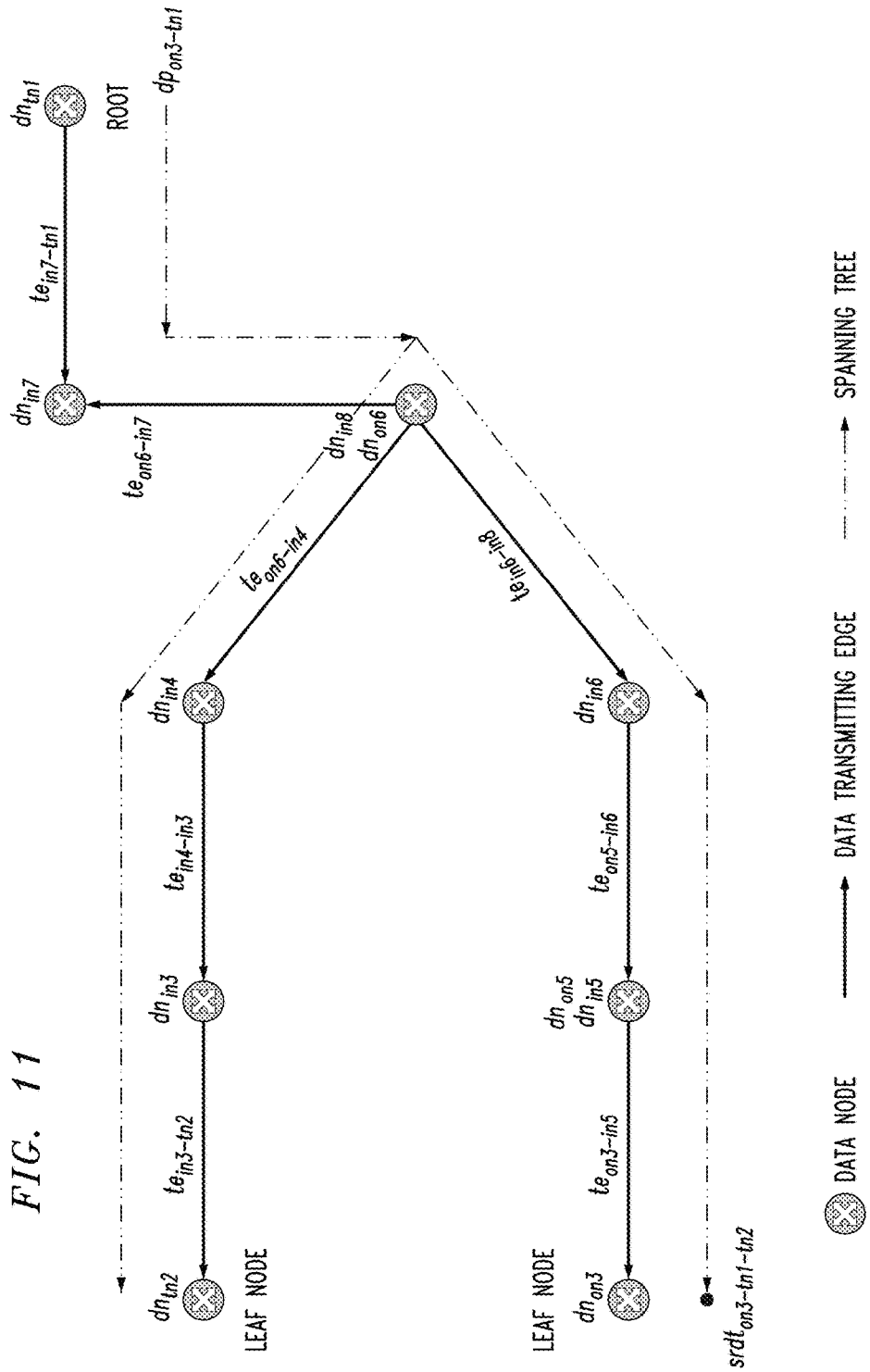
FIGS. 11 and 12 show data paths associated with respective spanning tree and inverse spanning tree arrangements in an illustrative embodiment.
Figure 12:
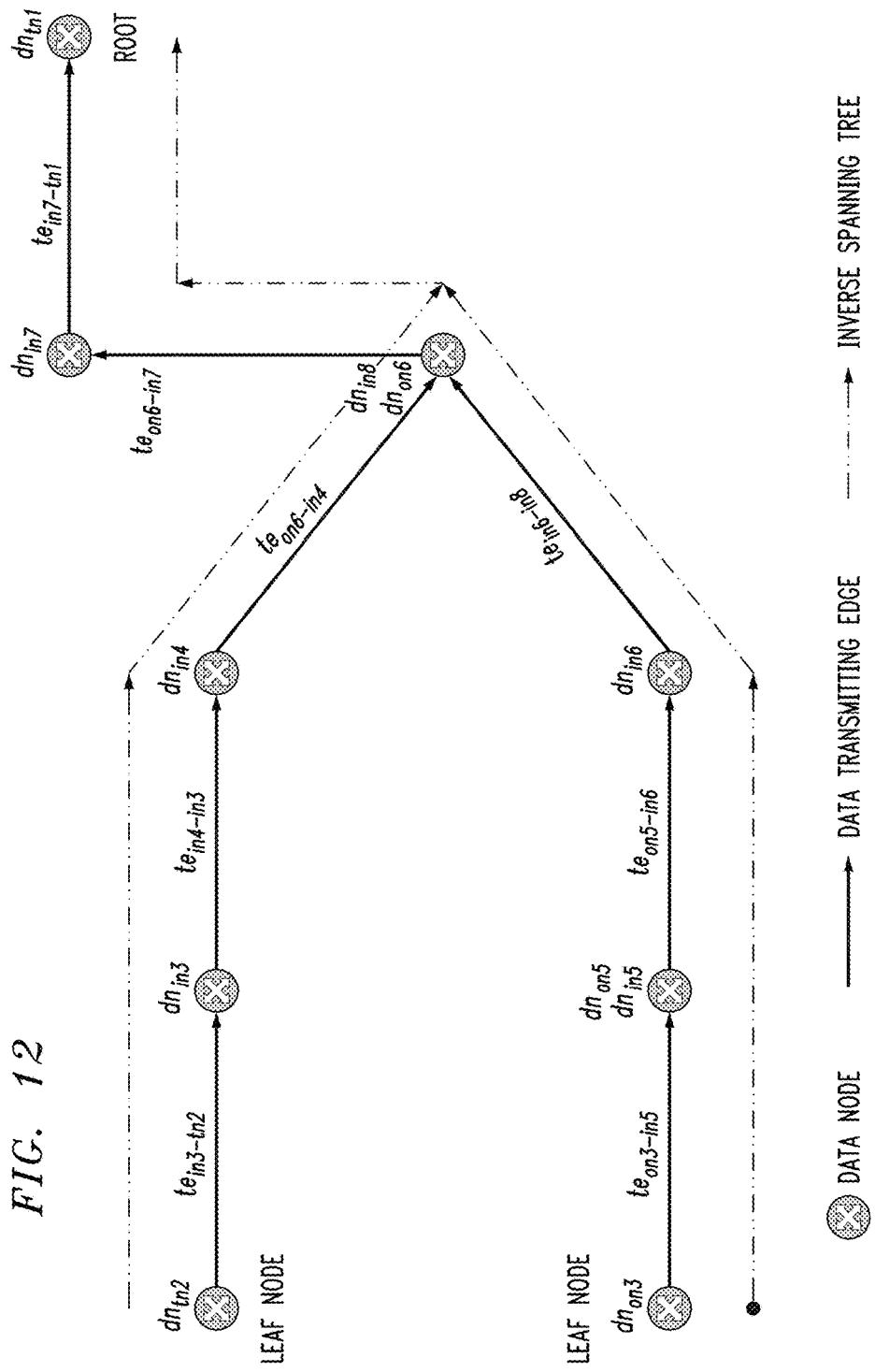

Referring now to FIGS. 11 and 12, these figures show data paths associated with respective spanning tree and inverse spanning tree arrangements in an illustrative embodiment. These arrangements show that the same set of data nodes can move traffic in opposite directions. In the spanning tree arrangement of FIG. 11, the flow of data is from a root node to multiple leaf nodes, while in the inverse spanning tree arrangement of FIG. 12, the flow of data is from the multiple leaf nodes to the root node. As mentioned previously, some embodiments utilize an inverse spanning tree such as that shown in FIG. 12 to configure one or more data paths. The inverse spanning tree is particularly well suited for use in embodiments in which data gathered by hundreds of thousands of IoT devices at respective leaf nodes of the tree are aggregated along data paths towards a root node. The aggregation and other processing of the data as it travels along the data paths illustratively includes combining the data with relevant additional information at multiple ones of the data nodes.

Figure 13:
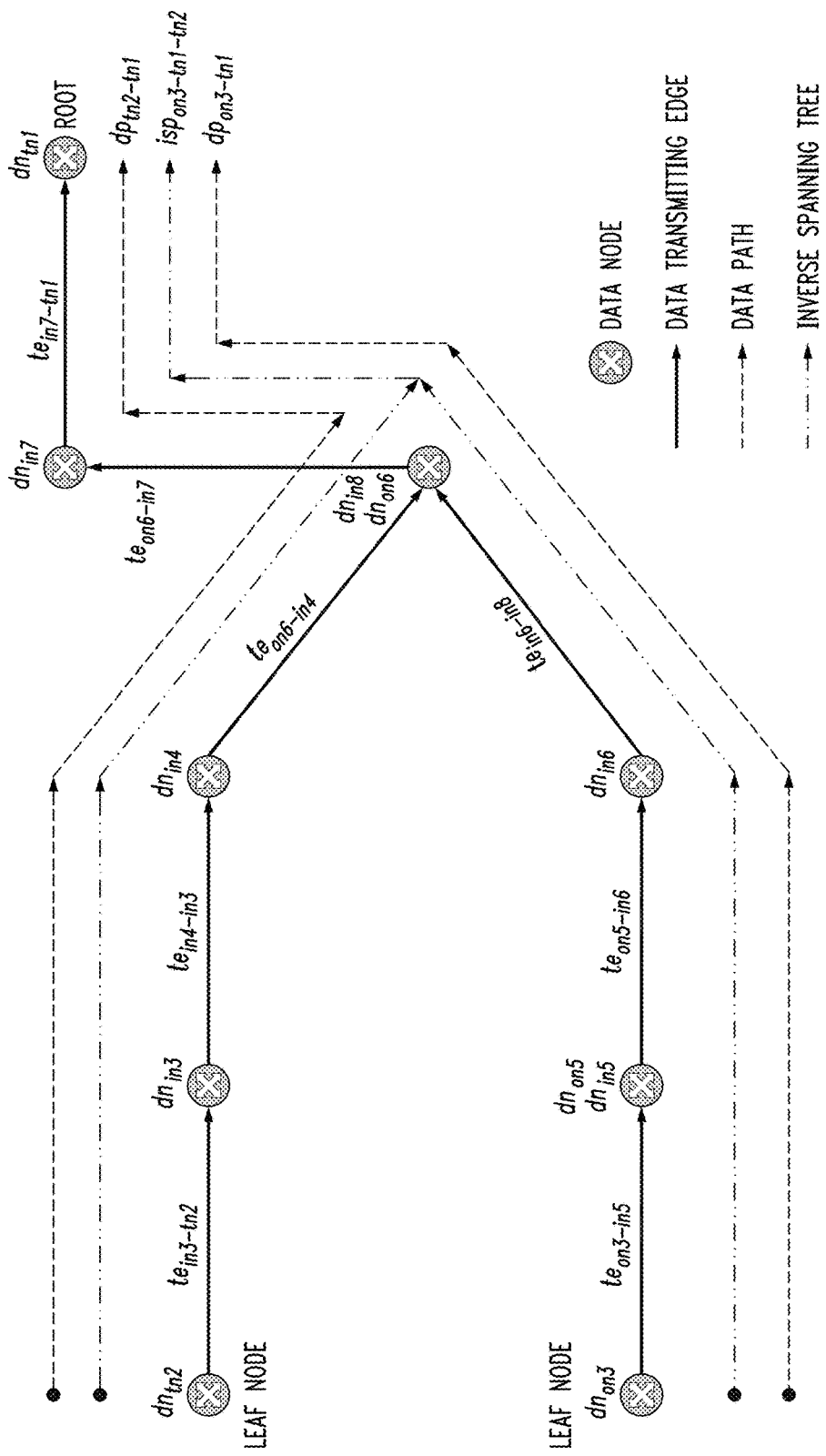
FIG. 13 shows another example of data paths associated with an inverse spanning tree in one embodiment.
Figure 14:
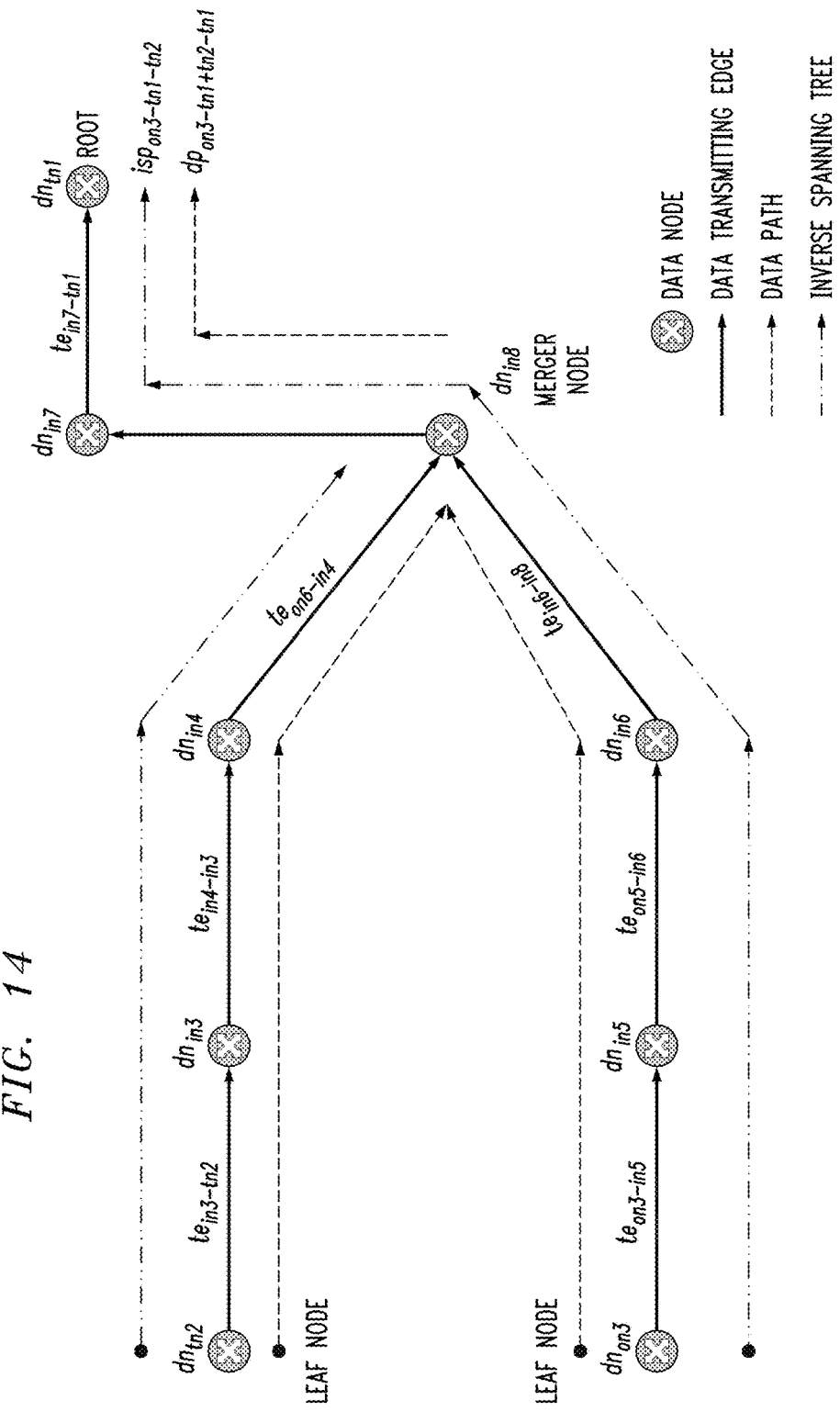
FIG. 14 illustrates merging of data paths in one embodiment.

In some embodiments, data paths can be merged. This is illustrated in FIGS. 13 and 14. FIG. 13 shows another example of data paths associated with an inverse spanning tree in one embodiment. The merging of data paths is illustrated in FIG. 14. More particularly, in this embodiment, if the data paths that form an inverse spanning tree actually have an overlap, then the parts of the data paths that overlap can be merged at a merger node as illustrated. This merger process can be automated so as to effectively avoid redundant transmission of data across multiple shared portions of one or more data paths.

Figure 15:
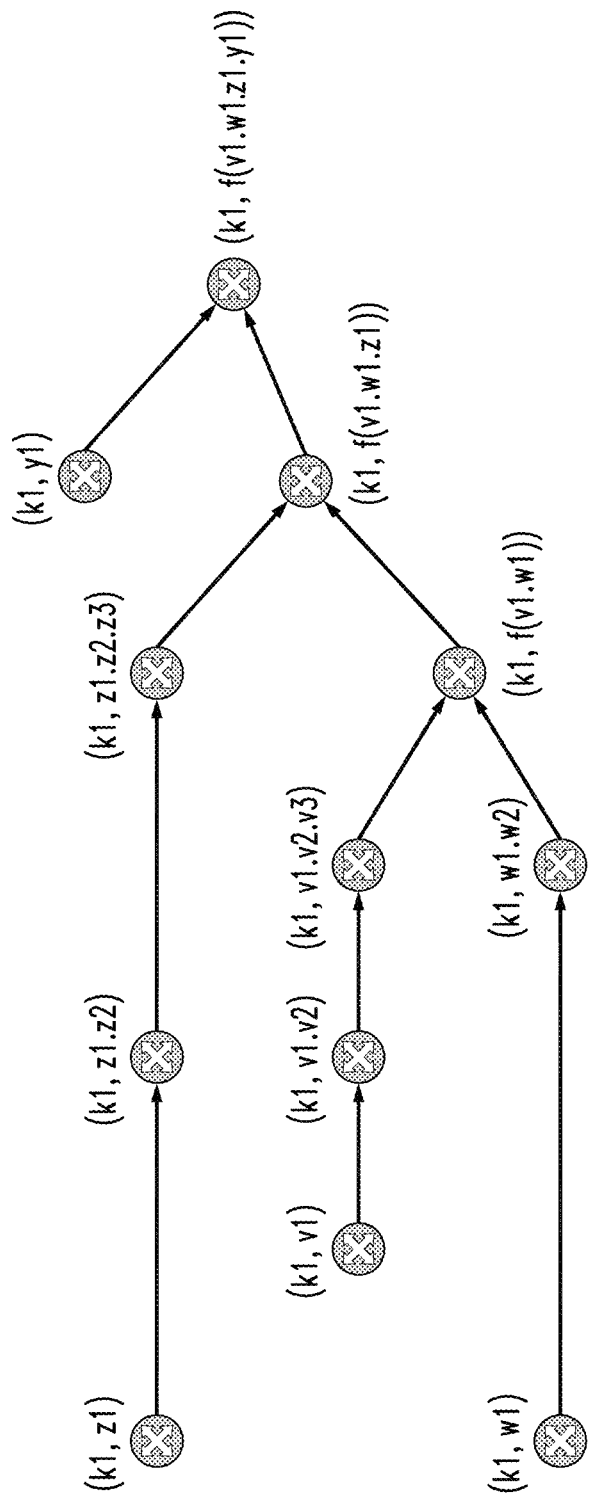
FIGS. 15 and 16 show examples of various types of data manipulations that can occur at processing nodes along data paths in an illustrative embodiment.
Figure 16:
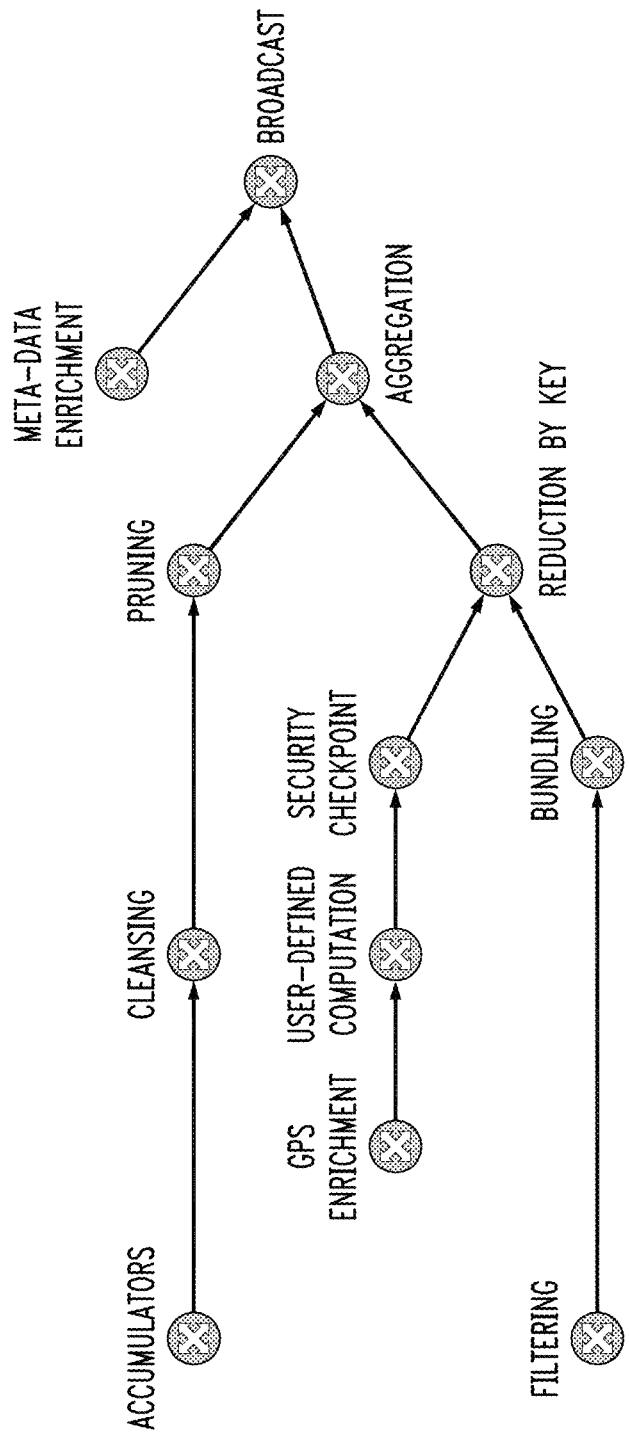

As mentioned above, the data nodes of a distributed analytics platform can perform various types of operations consistent with the roles of those data nodes. FIGS. 15 and 16 show examples of various types of data manipulations that can occur at data nodes along data paths in an illustrative embodiment. For example, with reference to FIG. 15, the roles of the data nodes can take the form of various functions. More specific examples are illustrated in FIG. 16, and in this embodiment include accumulation, cleansing, pruning, aggregation, GPS enrichment, user-defined computation, security check, filtering, bundling, reduction by key, metadata enrichment and broadcast. A wide variety of other types of functionality can be implemented by the data nodes in a given embodiment.

Figure 17:
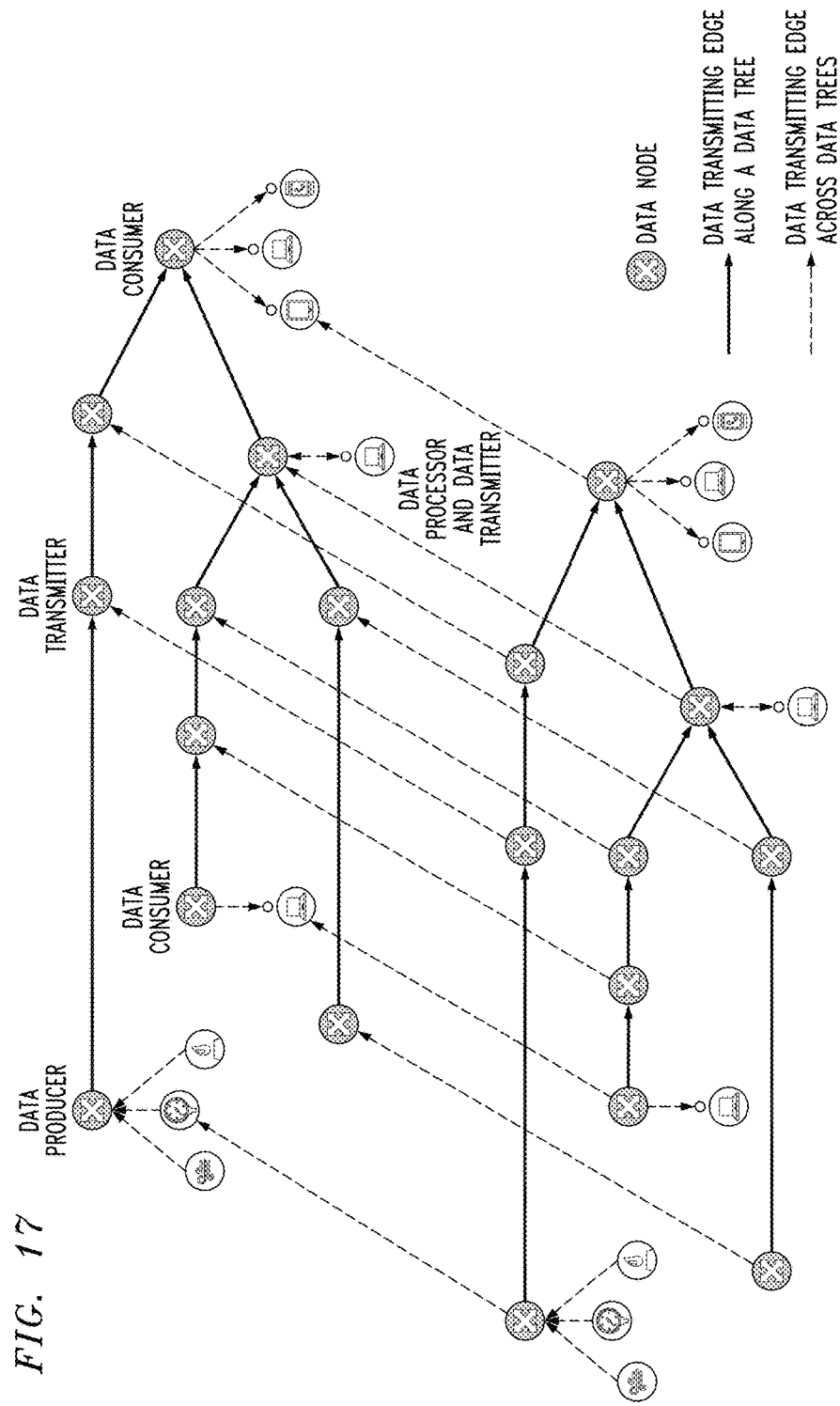
FIG. 17 shows overlay relationships between multiple trees at different levels in an illustrative embodiment.

FIG. 17 shows overlay relationships between multiple trees at different levels in an illustrative embodiment. This embodiment illustrates that portions of the same physical tree can be associated with multiple distinct levels of data flows. It need not be an overlay of the complete physical tree and can instead involve overlay of only portions of the physical tree, such as various sets of one or more data nodes of the physical tree. Each such level may be viewed as a different tree comprising a plane of communication possibly involving different sets of data nodes of the underlying physical tree. For example, data can flow from a data node on one level to another data node on a different level. Accordingly, data processed along a given data path in some embodiments can traverse multiple levels of distinct data node sets associated with the same underlying physical tree.

Distributed analytics platforms of the type described above are useful in a wide variety of different contexts and applications.

An example of one such context is precision dairy farming, as will now be described with reference to FIGS. 18 through 21.

Figure 18:
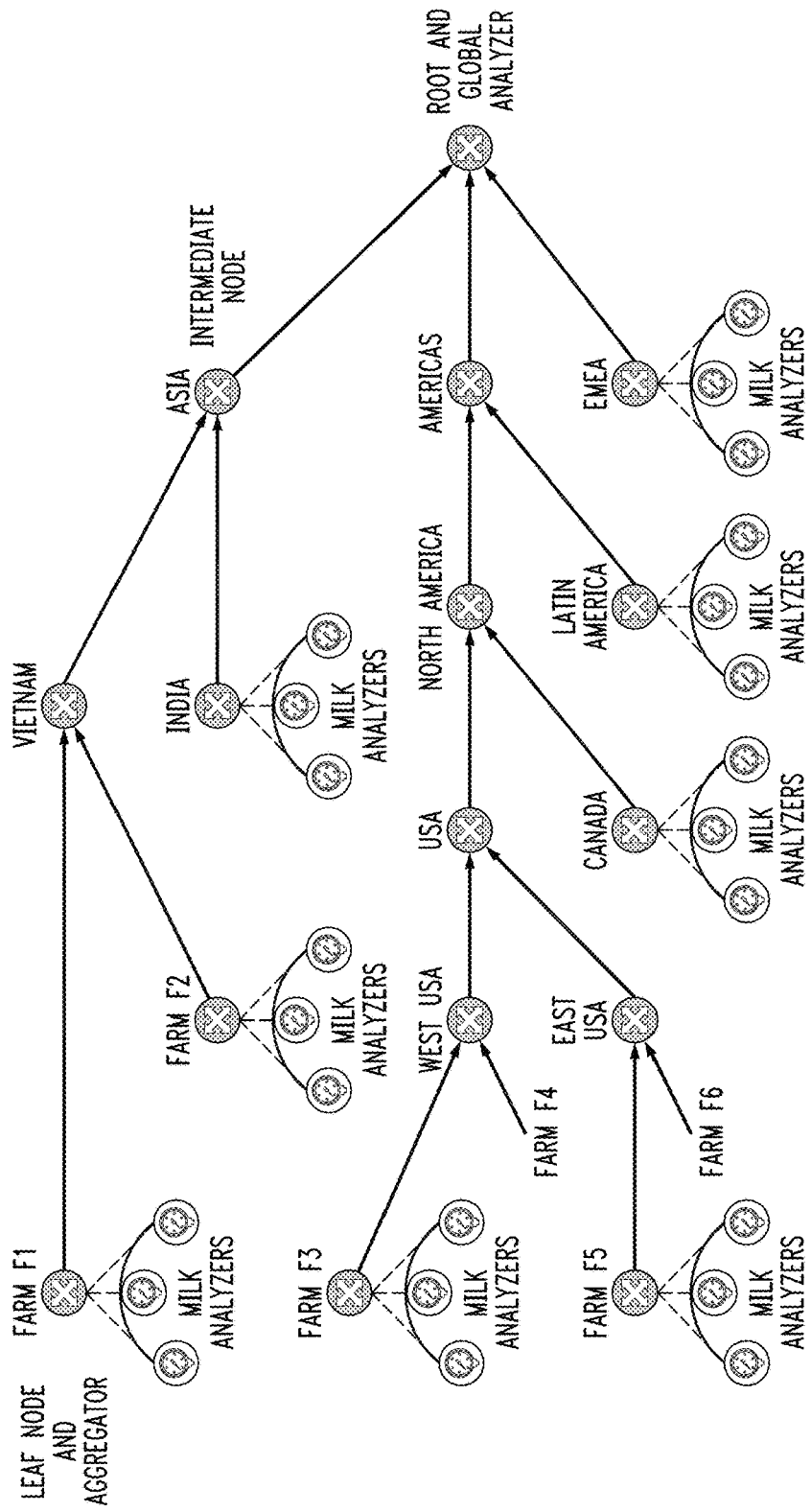
FIG. 18 shows an instance of a distributed analytics platform in a precision dairy farming use case for IoT devices of a particular type.
Figure 19:
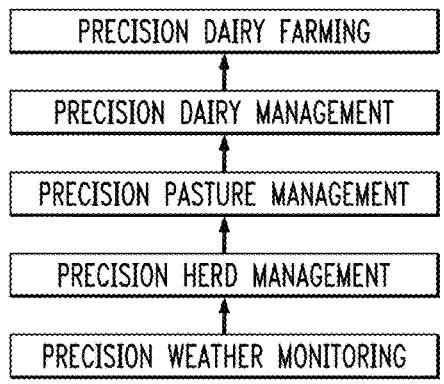
FIGS. 19-21 illustrate additional aspects of the precision dairy farming use case.
Figure 20:
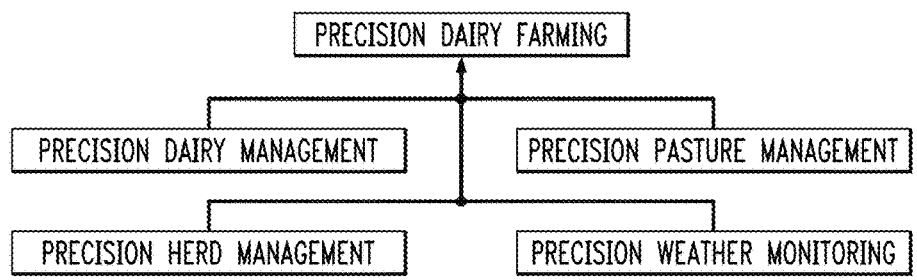
Figure 21:
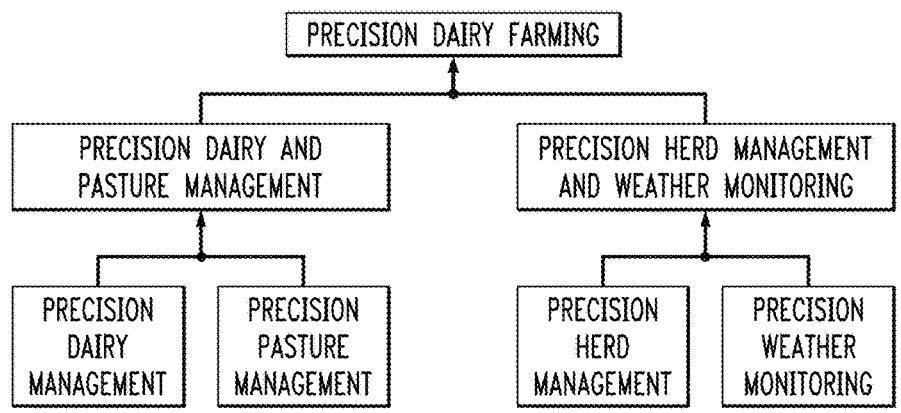

With reference initially to FIG. 18, an instance of a distributed analytics platform in a precision dairy farming use case is shown. This instance is for IoT devices that are in the form of respective milk analyzers arranged at geographically-distributed dairy farms. The distributed analytics platform further includes respective additional instances for other types of IoT devices implemented at the dairy farms, including instances for soil and pasture sensors, cattle sensors and weather sensors. The instances of the distributed analytics platform that include the respective sets of milk analyzers, soil and pasture sensors, cattle sensors and weather sensors provide respective arrangements for precision dairy management, precision pasture management, precision herd management and precision weather monitoring. These multiple instances of the distributed analytics platform in this embodiment collectively provide functionality for precision dairy farming, as illustrated in FIG. 19. The various instances for precision dairy management, precision pasture management, precision herd management and precision weather monitoring associated with the respective sets of distinct IoT devices can be combined in different ways, as illustrated in FIGS. 20 and 21, in providing the overall functionality for precision dairy farming in this particular use case.

The distributed analytics platform in the precision dairy farming use of case of FIGS. 18 to 21 may be viewed as comprising multiple distinct planes of communication, each involving one of the instances and its corresponding set of distinct IoT devices. Each such instance is illustratively treated as a separate tree in which data can be processed in a unique way as it traverses the tree from the data sources to the data destinations. For example, as illustrated in FIG. 18, the instance of the tree for the set of milk analyzers includes leaf nodes, intermediate nodes and a root node. The data is processed at various data nodes of the tree as it propagates from the leaf nodes through the intermediate nodes to the root node. The root node is illustratively configured with global analyzer functionality. Each of the other instances of the distributed analytics platform processes data from a different set of IoT devices in order to provide other types of analysis within the overall system. The use of multiple distinct instances each corresponding to a different level or analytics domain provides a much higher level of precision than would otherwise be possible, as the processing of the data as it traverses the tree can be customized for the particular needs and characteristics of each domain.

The various planes, domains or levels in this embodiment can be combined in various ways, such as sequentially, at a master plane, or within a hierarchy. As another example, a separate additional tree can be provided to combine the analytics results from the various distinct instances that form respective ones of the planes, domains or levels.

Additionally or alternatively, each node in a tree in a given plane can be mapped to the same geographical division, and data can flow from specific data nodes in a tree to other specific nodes in other trees.

The layouts of the various trees can vary depending upon the particular needs of the corresponding domain. For example, some trees may be optimized for bandwidth while others are optimized for physical path length and still others are optimized for privacy, security or other compliance policies.

In some embodiments, optimization is performed in accordance with parameters specified in Service Level Agreements (SLAs), such as availability of bandwidth capacity, speed of transmission and cost of transmission.

With regard to the precision dairy farming use case, the milk analyzers of the precision dairy management domain may be configured to route milk to different containers based on the coagulation level of the milk. For example, for every 200 ml of milk collected, the coagulation level is measured. If the coagulation level is above a threshold, the next 200 ml will go to a container for milk with a high coagulation level. If not, it will go to a container for milk with a low coagulation level. The distributed analytics platform in this particular precision dairy farming use case can be configured to determine an optimal coagulation threshold on a per-farm basis and even on a per-cow basis. This provides a much higher level of precision than, for example, an arrangement in which the coagulation measurements from all of the farms are sent to a central location for performance of analytics to determine a single coagulation threshold that is then utilized by all of the farms.

The distributed analytics platform in this use case provides an ability to adapt in real time to changing conditions as those conditions are detected by the IoT devices. Intermediate analytics results can be used to provide feedback to the dairy farms without the need for centralized determination of a global analytics result.

Again, this particular use case is only an example, and embodiments of the invention can be implemented in a wide variety of other contexts and applications.

As indicated elsewhere herein, illustrative embodiments can provide a number of significant advantages relative to conventional arrangements.

For example, some embodiments allow computations to be performed at every step of any data path the data traverses, from its source, to any of its many destinations. In addition, such embodiments provide a framework for the orchestration, execution and management of the computations.

These and other embodiments provide frameworks for analytics at web scale, with an ability to expand horizontally along the data path as well as vertically across multiple levels of abstraction.

The configuration of data trees, data paths and data nodes in illustrative embodiments is highly dynamic and can be adapted across many industries and analysis domains.

Some embodiments provide distributed analytics platforms that are faster and more efficient than conventional analytics systems. Moreover, distributed analytics platforms in some embodiments are implemented in a decentralized and privacy-preserving manner. These and other distributed analytics platforms advantageously overcome disadvantages of conventional analytics systems, which as indicated previously often rely on copying of local data to a centralized site for analysis, leading to privacy and performance concerns.

It is to be appreciated that the particular types of system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as distributed data processing nodes 102 and data sources 104, or portions thereof, can be implemented as respective tenants of such a multi-tenant environment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of a given YARN cluster or associated data processing node in a particular embodiment are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, distributed analytics platforms, application frameworks, processing nodes, data sources, data destinations and other components. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
  receiving data from a first data source at a first one of a plurality of distributed processing nodes of an analytics platform;
  performing one or more analytics operations on the data at the first processing node;
  updating the data at the first processing node based on results of the one or more analytics operations;
  transmitting the updated data to another one of the processing nodes along a first data path between the first data source and a first data destination; and
  repeating the performing, updating and transmitting for the other processing node and for one or more additional distributed processing nodes of the analytics platform along the first data path;
  the analytics platform thereby performing distributed analytics processing on the data over multiple ones of the distributed processing nodes as the data moves through the first data path from the first data source to the first data destination;
  wherein the method is implemented by at least one processing device comprising a processor coupled to a memory;
  wherein each of at least a subset of the distributed processing nodes is a part of multiple distinct data paths and performs distinct analytics operations for different ones of the data paths such that a role of a given one of the processing nodes in the analytics platform varies based at least in part on the particular data path over which data is received for processing;

wherein the first processing node is part of the subset of the distributed processing nodes and is a part of at least two distinct data paths including the first data path between the first data source and the first data destination and at least a second data path between a second data source and a second data destination;

wherein the first processing node performs a first type of analytics operation for a first role when receiving data on the first data path;

wherein the first processing node performs a second type of analytics operation for a second role when receiving data on the second data path;

wherein the first and second roles comprise respective distinct sets of one or more analytics-related processing tasks;

wherein the first role and the second role of the first processing node are defined by a distributed service of a software-defined function of the analytics platform; and wherein updating the data based on results of the one or more analytics operations comprises two or more of:
adding metadata to the data;
modifying existing metadata of the data; and
transforming the data into a different format.

2. The method of claim 1 wherein the analytics platform is configured to determine the first data path as at least a portion of an inverse spanning tree.

3. The method of claim 1 wherein the distributed processing nodes of the analytics platform comprise a plurality of distributed processing node clusters associated with respective data zones, each of the clusters being configured to perform analytics operations utilizing local data resources locally accessible within its corresponding data zone.

4. The method of claim 3 wherein the plurality of distributed processing node clusters comprise respective Yet Another Resource Negotiator (YARN) clusters.

5. The method of claim 1 wherein the plurality of distributed processing nodes are arranged in multiple distinct abstraction levels with each such level implementing a different type of analytics functionality.

6. The method of claim 1 wherein the data comprises IoT data from a data source comprising one or more IoT devices.

7. The method of claim 1 wherein the analytics platform is configured to optimize configuration of the first data path for one or more specified parameters relating to transmission of the data from the data source to the data destination including one or more of speed, bandwidth, cost and compliance.

8. The method of claim 1 wherein the one or more analytics operations performed by a given one of the processing nodes include at least one of:
a user-defined function; and
a function selected from a catalog of available functions.

9. The method of claim 1 wherein updating the data based on results of the one or more analytics operations comprises at least one of:
combining the data with data from one or more other data paths;
replacing at least a portion of the data with data from one or more other data paths; and
modifying at least a portion of the data based at least in part on the data from one or more other data paths.

10. The method of claim 1 further comprising providing intermediate analytics results based at least in part on intermediate analytics operations performed at respective intermediate ones of the processing nodes that are part of the first data path between the data source and the data destination.

11. The method of claim 1 wherein a given analytics operation performed at a particular one of the processing nodes utilizes local information available to that processing node within a corresponding local data zone.

12. The method of claim 1 wherein the method is performed at least in part in a worldwide data node.

13. A computer program product comprising a non-transitory processor-readable storage medium having stored therein program code of one or more software programs, wherein the program code when executed by at least one processing device causes said at least one processing device:
to receive data from a first data source at a first one of a plurality of distributed processing nodes of an analytics platform;
to perform one or more analytics operations on the data at the first processing node;
to update the data at the first processing node based on results of the one or more analytics operations;
to transmit the updated data to another one of the processing nodes along a first data path between the first data source and a first data destination; and
to repeat the performing, updating and transmitting for the other processing node and for one or more additional distributed processing nodes of the analytics platform along the first data path;
the analytics platform thereby performing distributed analytics processing on the data over multiple ones of the distributed processing nodes as the data moves through the first data path from the first data source to the first data destination;
wherein each of at least a subset of the distributed processing nodes is a part of multiple distinct data paths and performs distinct analytics operations for different ones of the data paths such that a role of a given one of the processing nodes in the analytics platform varies based at least in part on the particular data path over which data is received for processing;
wherein the first processing node is part of the subset of the distributed processing nodes and is a part of at least two distinct data paths including the first data path between the first data source and the first data destination and at least a second data path between a second data source and a second data destination;
wherein the first processing node performs a first type of analytics operation for a first role when receiving data on the first data path;
wherein the first processing node performs a second type of analytics operation for a second role when receiving data on the second data path;
wherein the first and second roles comprise respective distinct sets of one or more analytics-related processing tasks;
wherein the first role and the second role of the first processing node are defined by a distributed service of a software-defined function of the analytics platform; and
wherein updating the data based on results of the one or more analytics operations comprises two or more of:
adding metadata to the data;
modifying existing metadata of the data; and
transforming the data into a different format.

14. The computer program product of claim 13 wherein the plurality of distributed processing nodes are arranged in multiple distinct abstraction levels with each such level implementing a different type of analytics functionality.

15. The computer program product of claim 13 wherein a given analytics operation performed at a particular one of the processing nodes utilizes local information available to that processing node within a corresponding local data zone.

16. An apparatus comprising:
a first processing node of an analytics platform;
the first processing node being one of a plurality of distributed processing nodes of the analytics platform and being configured for communication with other ones of the distributed processing nodes over one or more networks;
the first processing node being further configured:
to receive data from a first data source;
to perform one or more analytics operations on the data;
to update the data based on results of the one or more analytics operations; and
to transmit the updated data to another one of the processing nodes along a first data path between the first data source and a first data destination;
wherein the performing, updating and transmitting are repeated for the other processing node and for one or more additional distributed processing nodes of the analytics platform along the first data path;
the analytics platform thereby performing distributed analytics processing on the data over multiple ones of the distributed processing nodes as the data moves through the first data path from the first data source to the first data destination;
wherein each of at least a subset of the distributed processing nodes is a part of multiple distinct data paths and performs distinct analytics operations for different ones of the data paths such that a role of a given one of the processing nodes in the analytics platform varies based at least in part on the particular data path over which data is received for processing;
wherein the first processing node is part of the subset of the distributed processing nodes and is a part of at least two distinct data paths including the first data path between the first data source and the first data destination and at least a second data path between a second data source and a second data destination;
wherein the first processing node performs a first type of analytics operation for a first role when receiving data on the first data path;
wherein the first processing node performs a second type of analytics operation for a second role when receiving data on the second data path;
wherein the first and second roles comprise respective distinct sets of one or more analytics-related processing tasks;
wherein the first role and the second role of the first processing node are defined by a distributed service of a software-defined function of the analytics platform; and
wherein updating the data based on results of the one or more analytics operations comprises two or more of:
adding metadata to the data;
modifying existing metadata of the data; and
transforming the data into a different format.

17. An information processing system comprising the apparatus of claim 16.

18. The apparatus of claim 16 wherein a given analytics operation performed at a particular one of the processing nodes utilizes local information available to that processing node within a corresponding local data zone.

19. The apparatus of claim 16 wherein the plurality of distributed processing nodes are arranged in multiple distinct abstraction levels with each such level implementing a different type of analytics functionality.

* * * * *